US011092964B2

(12) United States Patent
Kunzi et al.

(10) Patent No.: US 11,092,964 B2
(45) Date of Patent: *Aug. 17, 2021

(54) COLLISION-AVOIDANCE SYSTEM AND METHOD FOR UNMANNED AIRCRAFT

(71) Applicant: Aurora Flight Sciences Corporation, Manassas, VA (US)

(72) Inventors: Fabrice Kunzi, Manassas, VA (US); Andrew Kehlenbeck, Manassas, VA (US); Donald Rogers, Manassas, VA (US); Michael Sardonini, Manassas, VA (US); Edward Scott, Cambridge, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/724,819

(22) Filed: Dec. 23, 2019

(65) Prior Publication Data

US 2020/0278679 A1 Sep. 3, 2020

Related U.S. Application Data

(63) Continuation of application No. 15/863,529, filed on Jan. 5, 2018, now Pat. No. 10,520,944.

(Continued)

(51) Int. Cl.
*G05D 1/02* (2020.01)
*G05D 1/00* (2006.01)
(Continued)

(52) U.S. Cl.
CPC ......... *G05D 1/0202* (2013.01); *G05D 1/0055* (2013.01); *G05D 1/0088* (2013.01);
(Continued)

(58) Field of Classification Search
CPC ............... G05D 1/0055; G05D 1/0088; G05D 1/0202; G05D 1/101; G05D 1/102;
(Continued)

(56) References Cited

U.S. PATENT DOCUMENTS 4,918,607 A * 4/1990 Wible ..................... G01S 17/74
701/23
5,831,563 A * 11/1998 Barnes ................ G01S 13/9089
342/123

(Continued)

FOREIGN PATENT DOCUMENTS

EP 1340999 A1 9/2003
EP 2042963 A2 4/2009

(Continued)

OTHER PUBLICATIONS

Aurora Flight Sciences—Skate, retrieved from <www.aurora.aero/Products/skate.aspx> on Jan. 14, 2013.

(Continued)

*Primary Examiner* — Tyler J Lee
(74) *Attorney, Agent, or Firm* — Michael Stanley Tomsa; McAndrews, Held & Malloy, Ltd.; Eugene H. Nahm

(57) ABSTRACT

An obstacle-avoidance system for a vehicle, the obstacle-avoidance system may comprise: a communication device; a plurality of sensors, the plurality of sensors configured to detect collision threats within a predetermined distance of the vehicle; and a processor. The processor may communicatively couple to the communication device and the plurality of sensors and configured to receive navigation commands being communicated to a control system via said communication device. The processor may also receive, from at least one of said plurality of sensors, obstruction data reflecting the position of an obstruction. Using the obstruction data, the processor identifies a direction for avoiding said obstruction. In response, the processor may output, via (Continued)

said communication device, a command to said control system causing the vehicle to travel in said flight direction. Using the obstruction data, the processor may further perform a landing assist module, a three-region collision protection function with pilot override, and/or a target-filtering function.

20 Claims, 12 Drawing Sheets

Related U.S. Application Data

(60) Provisional application No. 62/443,087, filed on Jan. 6, 2017.

(51) Int. Cl.
    *G08G 5/04*           (2006.01)
    *G08G 5/02*           (2006.01)
    *G05D 1/10*           (2006.01)
    *G08G 5/00*           (2006.01)

(52) U.S. Cl.
    CPC ........... *G05D 1/102* (2013.01); *G08G 5/0013* (2013.01); *G08G 5/0021* (2013.01); *G08G 5/0069* (2013.01); *G08G 5/025* (2013.01); *G08G 5/045* (2013.01)

(58) Field of Classification Search
    CPC ............... G08G 5/0013; G08G 5/0021; G08G 5/0069; G08G 5/025; G08G 5/045
    See application file for complete search history.

(56) References Cited

U.S. PATENT DOCUMENTS

| | | | |
|---|---|---|---|
| 6,064,924 A | 5/2000 | Fleischmann | |
| 6,219,594 B1 | 4/2001 | Nicosia et al. | |
| 6,268,803 B1 | 7/2001 | Gunderson et al. | |
| 6,670,910 B2 | 12/2003 | Delcheccolo et al. | |
| 6,678,210 B2 | 1/2004 | Rowe | |
| 6,960,750 B2 | 11/2005 | Doane | |
| 6,975,246 B1 | 12/2005 | Trudeau | |
| 7,059,564 B2 | 6/2006 | Dennis | |
| 7,136,011 B2 | 11/2006 | Mork et al. | |
| 7,194,358 B2 | 3/2007 | Callaghan et al. | |
| 7,318,564 B1 | 1/2008 | Marshall | |
| 7,369,460 B2 | 5/2008 | Chiappetta et al. | |
| 7,443,154 B1 | 10/2008 | Merewether et al. | |
| 7,714,536 B1 | 5/2010 | Silberg | |
| 7,725,258 B2 | 5/2010 | Smitherman | |
| 7,751,976 B2 | 7/2010 | Matuska et al. | |
| 7,791,529 B2 | 9/2010 | Filias et al. | |
| 7,982,662 B2 | 7/2011 | Shaffer | |
| 8,167,234 B1 | 5/2012 | Moore | |
| 8,172,177 B2 | 5/2012 | Lovell et al. | |
| 8,232,910 B1 | 7/2012 | Burton | |
| 8,467,953 B2 | 6/2013 | Naderhirn | |
| 8,500,067 B2 | 8/2013 | Woodworth et al. | |
| 8,543,265 B2 | 9/2013 | Ekhaguere et al. | |
| 8,700,306 B2 | 4/2014 | Duggan et al. | |
| 8,970,401 B2 | 3/2015 | Molander et al. | |
| 9,352,834 B2 | 5/2016 | Davies | |
| 9,562,773 B2 | 2/2017 | Paduano et al. | |
| 2003/0043058 A1 | 3/2003 | Jamieson et al. | |
| 2003/0222173 A1 | 12/2003 | McGeer et al. | |
| 2005/0004723 A1 | 1/2005 | Duggan et al. | |
| 2005/0109872 A1 | 5/2005 | Voos et al. | |
| 2005/0271221 A1 | 12/2005 | Cerwin | |
| 2007/0046448 A1 | 3/2007 | Smitherman | |
| 2007/0195646 A1 | 8/2007 | Govindswamy et al. | |
| 2007/0210953 A1 | 9/2007 | Abraham et al. | |
| 2008/0027591 A1 | 1/2008 | Lenser et al. | |
| 2008/0269966 A1 | 10/2008 | Markiton et al. | |
| 2009/0164122 A1 | 6/2009 | Morbey et al. | |
| 2009/0201763 A1 | 8/2009 | Jones et al. | |
| 2009/0306840 A1 | 12/2009 | Blenkhorn et al. | |
| 2010/0057278 A1 | 3/2010 | Lee | |
| 2010/0228408 A1 | 9/2010 | Ford et al. | |
| 2010/0256909 A1 | 10/2010 | Duggan et al. | |
| 2010/0292871 A1 | 11/2010 | Schultz et al. | |
| 2011/0057074 A1 | 3/2011 | Woodworth et al. | |
| 2011/0066307 A1 | 3/2011 | Hiebl | |
| 2011/0160941 A1 | 6/2011 | Garrec et al. | |
| 2011/0160950 A1 | 6/2011 | Naderhim et al. | |
| 2011/0184593 A1 | 7/2011 | Swope | |
| 2011/0307126 A1 | 12/2011 | Hogstrom | |
| 2012/0130566 A1 | 5/2012 | Anderson | |
| 2012/0158222 A1 | 6/2012 | Ehlin et al. | |
| 2012/0199698 A1 | 8/2012 | Thomasson et al. | |
| 2012/0253582 A1 | 10/2012 | Chrysanthakopoulos et al. | |
| 2012/0293987 A1 | 11/2012 | Espedal et al. | |
| 2013/0001366 A1 | 1/2013 | Wolff et al. | |
| 2013/0110323 A1 | 5/2013 | Knight | |
| 2013/0120164 A1 | 5/2013 | Greene et al. | |
| 2013/0151203 A1 | 6/2013 | McEwen-King et al. | |
| 2013/0175390 A1 | 8/2013 | Woodworth et al. | |
| 2013/0325245 A1 | 12/2013 | Kolcarek et al. | |
| 2013/0332062 A1 | 12/2013 | Kreitmair-Steck et al. | |
| 2014/0012434 A1 | 1/2014 | Spence et al. | |
| 2014/0139366 A1 | 5/2014 | Moses et al. | |
| 2015/0234387 A1 | 8/2015 | Mullan et al. | |
| 2015/0260526 A1 | 9/2015 | Paduano et al. | |
| 2016/0125746 A1 | 5/2016 | Kunzi et al. | |
| 2016/0291132 A1* | 10/2016 | Goto | G01S 7/4026 |
| 2016/0318622 A1* | 11/2016 | Haukom | G07C 5/0808 |
| 2017/0137126 A1 | 5/2017 | Wong et al. | |
| 2018/0072404 A1 | 3/2018 | Prager et al. | |
| 2018/0275654 A1 | 9/2018 | Merz et al. | |
| 2018/0354506 A1* | 12/2018 | Minemura | B60R 21/00 |

FOREIGN PATENT DOCUMENTS

| | | |
|---|---|---|
| EP | 2177966 A2 | 4/2010 |
| EP | 2182419 A1 | 5/2010 |
| EP | 2287633 A1 | 2/2011 |
| EP | 2515147 A2 | 10/2012 |
| KR | 20100081759 A | 7/2010 |
| WO | 2007086055 A1 | 8/2007 |
| WO | 2008/085663 A2 | 1/2008 |
| WO | 2010071505 A1 | 6/2010 |
| WO | 2014/064431 A2 | 5/2014 |
| WO | 2016/008026 A1 | 1/2016 |
| WO | 2018129321 A1 | 7/2018 |

OTHER PUBLICATIONS

Barry, A. and Tedrake, R.; "Pushbroom Stereo for High-Speed Navigation in Cluttered Environments," arXiv:1407.7091 [cs.RO], (Submitted on Jul. 26, 2014).

Burns, Matt, "With SkySpecs Guardian, The Drones Have Become Self-Aware," https://techcrunch.com/2015/01/06/with-skyspecs-guardians-the-drones-have-become-self-aware/, Jan. 6, 2015.

David N. Lee, et al., Common principle of guidance by echolocation and vision; J Comp Physiol A (1992) 171:563-571.

F. Ruffier et al., Bio-Inspired Optical Flow Circuits for the Visual Guidance of Micro-Air Vehicles; IEEE 2003.

F. Ruffier, et al., Combining sound and optic flow cues to reach a sound source despite lateral obstacles; IEEE 2008.

Fisher, Jim, "DJI Adds Collision Collision Avoidance System to Phantom 4," http://www.pcmag.com/article2/0,2817,2500144,00.asp, Mar. 1, 2016.

Franck Ruffier, et al., A tiny directional sound sensor inspired by crickets designed for Micro-Air Vehicles; IEEE 2011.

Frédéric L. Roubieu, et al., A novel 1-gram insect based device measuring visual motion along 5 optical directions; IEEE 2011.

G. Warwick, Bat-Inspired Tech to Aid Flight Along Streets; Aviation Week's DTI, Oct. 27, 2008.

Geoffrey Portell I, et al., A 3D Insect-Inspired Visual Autopilot for Corridor-Following; Proceedings of the 2nd Biennial IEEEIRAS-

(56) References Cited

OTHER PUBLICATIONS

EMBS International Conference on Biomedical Robotics and Biomechatronics, Scottsdale, AZ, USA, Oct. 19-22, 2008.
Jong Jin Park, et al., abstract of "Giant Acoustic Concentration by Extraordinary Transmission in Zero Mass Metamatrials," Phys. Rev. Lett. 110, 244302 (published Jun. 13, 2013).
Junliang Tao, et al., Bio-inspired Flow and Acoustic Sensor; Proc. of SPIE vol. 8019 80190R-1, 2011.
Liu, J., Xiao, Y., Hao, Q., and Ghaboosi, K., Bio-inspired Visual Attention in Agile Sensing for Target Detection; International Journal of Sensor Networks vol. 5, No. 2, Jan. 2009.
Maryland Robotics Center, Horiuchi, Humbert Developing Bio-Inspired Navigation for Micro Air Vehicles; Oct. 29, 2008.
UCARS-V2 UAV Common Automatic Recovery System—Version 2 for Shipboard Operations, Sierra Nevada Corporation.
Zeitlin, Andrew et al., 'Collision Avoidance for Unmanned Aircraft: Proving the Safety Case.' The Mitre Corporation and MIT Lincoln Laboratory, Oct. 2006, pp. 1-12.
Transmittal; International Search Report; and Written Opinion of the International Searching Authority for International Application No. PCT/US2015/030099 dated Aug. 17, 2015.
International Search Report; and Written Opinion of the International Searching Authority for International Application No. PCT/US2018/012588 dated May 28, 2018.
Extended European search report for EU application No. 18215842.8, dated May 9, 2019.
Office action in Israel Application No. 26395, dated Apr. 11, 2021, and translation (7 pages).

\* cited by examiner

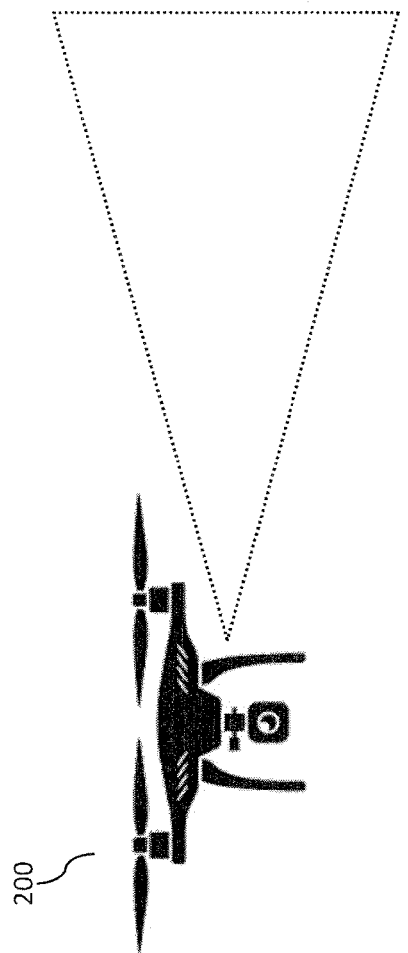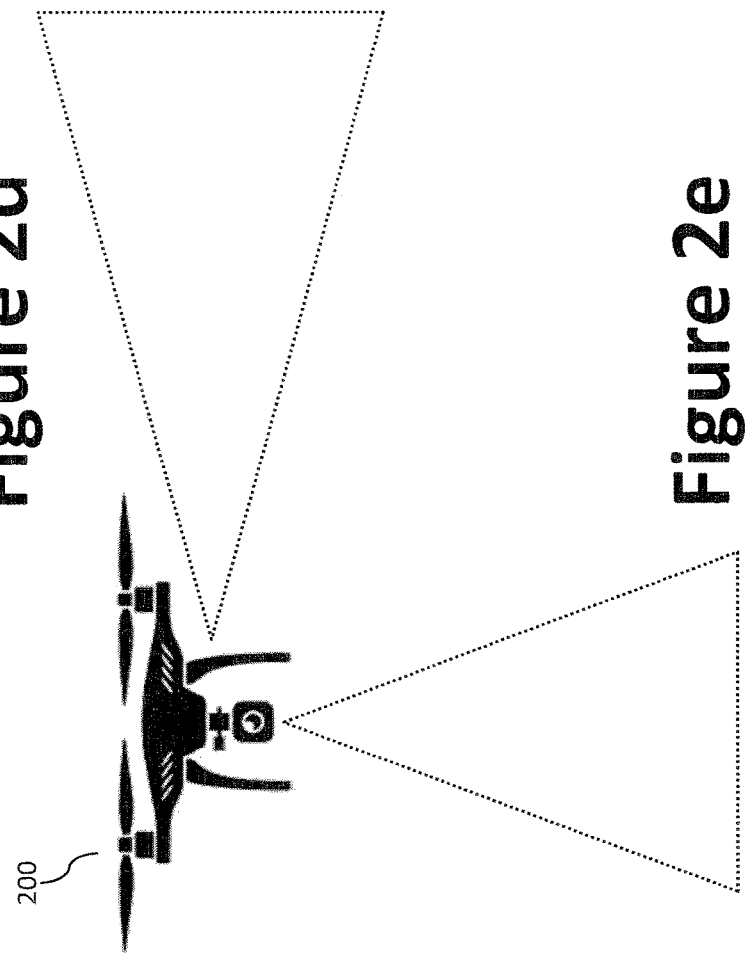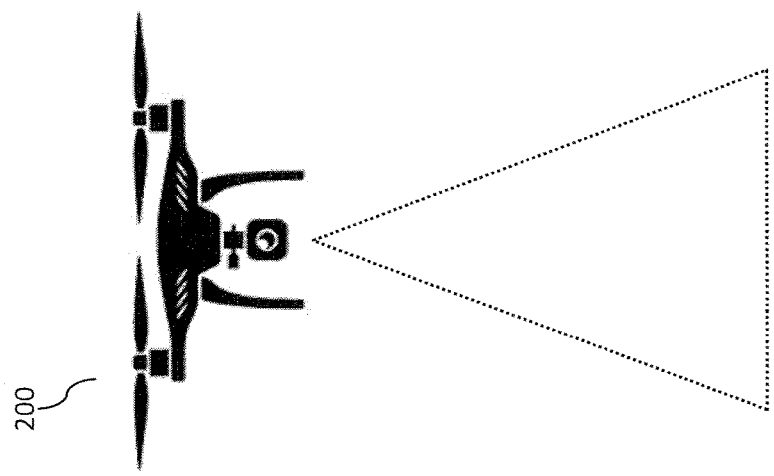

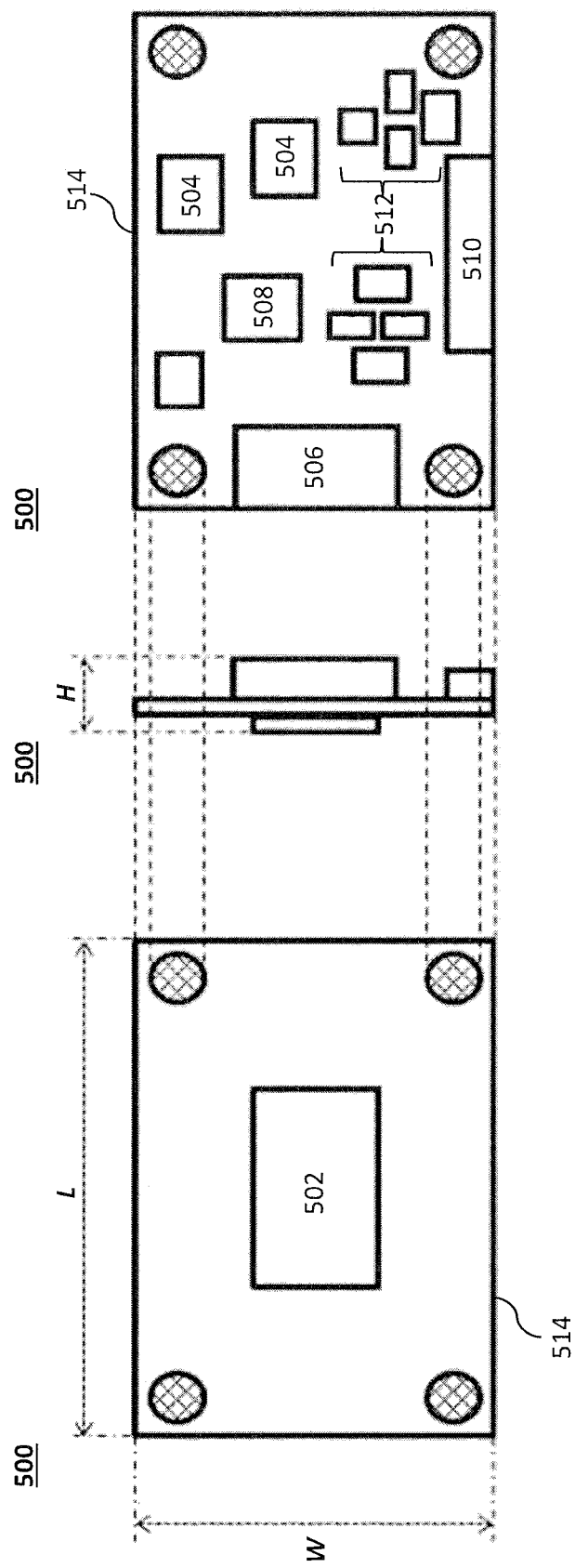

COLLISION-AVOIDANCE SYSTEM AND METHOD FOR UNMANNED AIRCRAFT

CROSS-REFERENCE TO RELATED APPLICATIONS

The present application is a continuation of U.S. patent application Ser. No. 15/863,529, filed Jan. 5, 2018, and titled "Collision-Avoidance System And Method For Unmanned Aircraft," which claims the benefit under 35 U.S.C. § 119(e) of provisional patent application No. 62/443,087, filed Jan. 6, 2017, the contents of which are hereby incorporated by reference.

FIELD

This present disclosure generally relates to autonomous vehicle navigation and, more specifically, to systems, methods, and techniques for detecting and automatically navigating around stationary and/or moving objects. This present disclosure also relates to sensor- and vehicle-agnostic systems, methods, and techniques for detecting and automatically navigating around objects.

BACKGROUND

Unmanned aerial vehicle ("UAV") technology has proven to be a valuable tool for mission profiles involving intelligence, surveillance, reconnaissance, and payload delivery. In contexts such as low-altitude urban reconnaissance, a UAV, such as a micro-air vehicle ("MAV"), may encounter both large and small obstacles that may be fixed or moving and whose position is not known in advance. Moreover, because UAVs and MAVs tend to fly in constrained, cluttered environments, they are prone to crashing or colliding with objects. Furthermore, UAVs and MAVs are generally less expensive than traditional aerial vehicles and, as such, are more prevalent and often utilized by less-skilled pilots who may, in turn, cause a collision. Existing technology for preventing UAVs and MAVs from running into objects and other obstacles, such as a Global Positioning System ("GPS"), is generally inadequate, as many objects cannot be recognized via a GPS device and, depending on the terrain, GPS accuracy performance varies widely across environments.

Accordingly, there remains a need for improved autonomous vehicle navigation systems and obstacle-avoidance systems that can respond to varied and unknown obstacles in cluttered navigational environments. Furthermore, there is also a need for an autonomous vehicle navigation or obstacle-avoidance system for augmenting and/or overriding navigation commands communicated to a vehicle.

SUMMARY

An autonomous vehicle may be improved with a flight-control system having a plurality of sensors (e.g., acoustic sensors, visual sensors, or the like). The plurality of sensors may be employed in connection with a collision-avoidance solution for small air vehicles, such as the Panoptes™ collision-avoidance system, more generally referred to as a dynamic obstacle-avoidance system.

According to a first aspect, a method for providing collision protection in an aircraft, the method comprises: receiving a sensor input from a sensor positioned on the aircraft and operatively coupled with a processor, wherein the sensor is configured to identify obstacles within a field of view; receiving a pilot command stream from a pilot; identifying an obstacle within the field of view based at least in part on said sensor input; determining a region from a plurality of regions within the field of view in which the obstacle is positioned, wherein the region is determined based at least in part on the sensor input; setting a control input as a function of the region determined in the determining step; inputting the control inputs to a proportional-derivative (PD) controller to generate control data; generating, via the processor, a control command stream as a function of the control data; and comparing, via the processor, the control command stream to the pilot command stream to determine whether the pilot command stream from the pilot is safe.

According to a second aspect, a navigation system for providing collision protection in an aircraft comprises: a sensor configured to couple to the aircraft and to identify obstacles within a field of view; a processor operatively coupled with the sensor and a memory device, wherein the processor is configured to receive a pilot command stream from a pilot, wherein the processor is further configured to: identify an obstacle within the field of view based at least in part on a sensor input from said sensor; determine a region from a plurality of regions within the field of view in which the obstacle is positioned, wherein the region is determined based at least in part on the sensor input; set a control input as a function of the region determined in the determining step; input the control inputs to a proportional-derivative (PD) controller to generate control data; generate, via the processor, a control command stream as a function of the control data; and compare, via the processor, the control command stream to the pilot command stream to determine whether the pilot command stream from the pilot is safe.

In certain aspects, the control command stream is communicated to a flight controller of the aircraft in lieu of the pilot command stream when the pilot command stream from the pilot is determined not to be safe.

In certain aspects, the pilot command stream is communicated to a flight controller of the aircraft when the pilot command stream from the pilot is determined to be safe.

In certain aspects, the sensor input comprises a range-rate estimate or a range estimate.

In certain aspects, the pilot command stream is from a human pilot.

In certain aspects, the pilot command stream is from an autopilot.

In certain aspects, the plurality of regions comprises a first region, a second region, and a third region, such an incoming region, a panic region, and/or a critical region.

In certain aspects, the first region is defined as an area between a sensor maximum range and a first threshold (e.g., an incoming threshold).

In certain aspects, the second region is defined as an area between the first threshold and the second threshold.

In certain aspects, the third region is defined as an area between a second threshold (e.g., a panic threshold) and the aircraft.

In certain aspects, a pilot command stream is determined not to be safe if the pilot command stream can be interpreted by the processor as attempting to (1) reduce the range between the aircraft and the obstacle or (2) increase the aircraft rate above a rate limit set by the control data.

In certain aspects, the a pilot override command may be received from the pilot, wherein the pilot override command overrides the control command stream.

In certain aspects, the processor is configured to perform a target-filtering operation.

In certain aspects, the target-filtering operation comprises the steps of: receiving range and magnitude data from a RADAR system for an obstacle within the aircraft's line of sight; determining, via the processor and based at least in part on the range and magnitude data, whether the magnitude is saturated; calculating, via the processor, a standard deviation of at least a portion of a trace reflecting the range and magnitude data over time; determining, via the processor, a new range point for the trace; calculating, via the processor, a minimum difference between the new range point for the trace and an assigned range from incoming data; and calculating a confidence and low-pass value, via the processor, via a critically damped low-pass filter (LPF).

In certain aspects, the confidence and low-pass value is calculated using a weighted average of statistical terms derived from a signal mean, a standard deviation, and a magnitude.

In certain aspects, the weighted average is operator-defined for a desired filter performance.

According to a third aspect, a method for providing target-filtering to increase precision in an aircraft comprises: receiving range and magnitude data from a RADAR system for an obstacle within the aircraft's line of sight; determining, via a processor for each of the predetermined number of obstacles based at least in part on the range and magnitude data, whether the magnitude is saturated, wherein the processor is configured to set ranges to a known good value if the magnitude is saturated; calculating, via the processor, a standard deviation of at least a portion of a trace reflecting the range and magnitude data over time; determining, via the processor, a new range point for the trace; calculating, via the processor, a minimum difference between the new range point for the trace and an assigned range from incoming data; determining, via the processor, whether each of a plurality of conditions are met, wherein the processor is configured to calculate a new filtered range point using linear regression if one or more of the plurality of conditions are not met; incrementing an iteration counter; and calculating a confidence and low-pass value, via the processor, via a critically damped low-pass filter (LPF).

In certain aspects, each of the steps is performed or repeated for each of a predetermined number of obstacles within the aircraft's line of sight.

In certain aspects, the predetermined number of obstacles comprises the five obstacles that are most prominent within the aircraft's line of sight.

In certain aspects, the standard deviation is of the most recent 20 points of the trace through linear regression of the 20 points.

In certain aspects, the minimum difference is a different between the trace's most recent range and an assigned range from incoming data.

In certain aspects, the plurality of conditions comprises: whether (1) the minimum difference is greater than 3.5 times the standard deviation; and (2) the minimum difference is greater than 0.4.

In certain aspects, the plurality of conditions further comprises: whether (1) the standard deviation is less than 0.2; and (2) the iteration counter is less than 15.

In certain aspects, the confidence and low-pass value is calculated using a weighted average of statistical terms derived from a signal mean, a standard deviation, and a magnitude.

In certain aspects, the weighted average is operator-defined for a desired filter performance.

BRIEF DESCRIPTION OF THE DRAWINGS

The foregoing and other objects, features, and advantages of the devices, systems, and methods described herein will be apparent from the following description of particular embodiments thereof, as illustrated in the accompanying figures, where like reference numbers refer to like structures. The figures are not necessarily to scale, emphasis instead is being placed upon illustrating the principles of the devices, systems, and methods described herein.

FIG. 2c illustrates an autonomous vehicle having its sensors positioned in a downward facing configuration.

FIG. 2d illustrates an autonomous vehicle having its sensors positioned in a forward facing configuration.

FIG. 2e illustrates an autonomous vehicle having its sensors positioned in both the forward facing configuration and the downward facing configuration.

FIGS. 5a through 5c illustrate an example RADAR flight control/collision avoidance (RFCA) module.

DESCRIPTION

Figure 1:
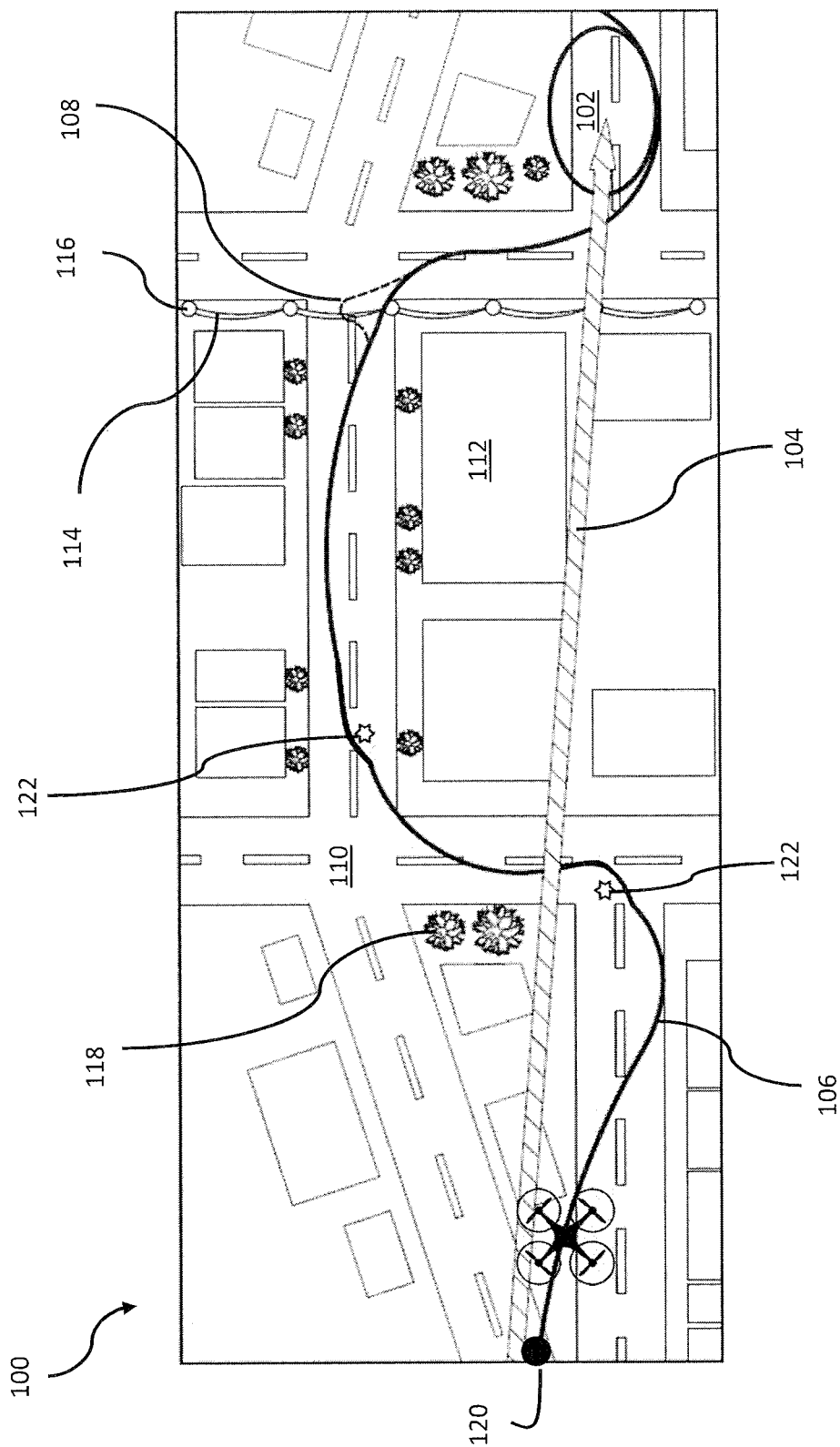
FIG. 1 illustrates an environment for autonomous navigation using a dynamic collision-avoidance system.

Embodiments of the present disclosure will be described hereinbelow with reference to the accompanying drawings. In the following description, well-known functions or constructions are not described in detail because they would obscure the present disclosure in unnecessary detail. Described herein are devices, systems, and methods for autonomous vehicle navigation and, in particular, for navigation using multiple methods of obstacle avoidance.

All documents mentioned herein are hereby incorporated by reference in their entirety. References to items in the singular should be understood to include items in the plural and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. Recitation of ranges of values herein are not intended to be limiting, referring instead individually to any and all values falling within the range, unless otherwise indicated herein, and each separate value within such a range is incorporated into the specification as if it were individually recited herein.

The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments. In the following description, it is understood that terms such as "first," "second," "top," "bottom," "side," "front," "back," and the like, are words of convenience and are not to be construed as limiting terms. For this application, the following terms and definitions shall apply:

The terms "aerial vehicle" and "aircraft" refer to a machine capable of flight, including, but not limited to, fixed wing aircraft, unmanned aerial vehicle, variable wing aircraft, and vertical take-off and landing (VTOL) aircraft.

The terms "communicate" and "communicating," as used herein, refer to both transmitting, or otherwise conveying, data from a source to a destination and delivering data to a communications medium, system, channel, network, device, wire, cable, fiber, circuit, and/or link to be conveyed to a destination.

The terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code.

The term "computer," as used herein, refers to a programmable device designed to sequentially and automatically carry out a sequence of arithmetic or logical operations, including without limitation, personal computers (e.g., those available from Gateway®, Hewlett-Packard®, IBM®, Sony®, Toshibs®, Dell®, Apple®, Cisco®, Sun®, etc.), handheld, processor-based devices, and any other electronic device equipped with a processor or microprocessor.

The term "exemplary" means serving as a non-limiting example, instance, or illustration. Similarly, as utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

The term "processor," as used herein, refers to processing devices, apparatus, programs, circuits, components, systems, and subsystems, whether implemented in hardware, tangibly embodied software or both, and whether or not programmable. The term "processor," as used herein includes, but is not limited to, one or more computers, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, and data processors.

The term "navigation command," as used herein, refers to instructions for guiding a vehicle. Navigation commands may be represented, or provided, by a flight-control system as digital or analog data instructions or signals. Navigation commands may be originated by, without limitation, an autopilot, a pilot (whether locally or remotely situated), and/or an obstacle-avoidance system. Navigation commands may be communicated to, for example, a controller or a steering mechanism.

The present disclosure endeavors to provide systems and methods for facilitating autonomous vehicle navigation and/or obstacle avoidance through detection of collision threats. As disclosed herein, autonomous vehicle navigation and/or obstacle avoidance may be facilitated by detecting one or more collision threats using, inter alia, auditory techniques (e.g., an echolocation sensor), visual techniques for sensing objects/obstacles (e.g., non-cooperative targets that are stationary and/or moving), or a combination thereof. Examples of such collision threats may include obstacles such as, without limitation, birds, people, other vehicles, structures (e.g., buildings, gates, towers, etc.), foliage (e.g., trees, bushes, etc.), and the like. Autonomous vehicle navigation and/or obstacle-avoidance functionality (e.g., any hardware and/or associated methods) may be incorporated with an aerial vehicle's control system (e.g., a flight-control system, whether manned or autopilot) during its initial design and fabrication; however, such functionality may be alternatively provided through an auxiliary system (e.g., an add-on system, or "retrofit" system) configured to control, or override, an existing flight-control system. When auxiliary systems are employed, it is preferable that they do not require modifications to the existing flight-control system (e.g., original navigational components) or the aerial vehicle's structure, thereby mitigating unwanted installation time and expense, while maintaining any component warranties, certifications, etc.

In certain aspects, the autonomous vehicle navigation and/or obstacle-avoidance functionality may be vehicle- and sensor-agnostic. Indeed, for common, small UAVs, overlap exists between the maximum ranges of the echo and visual sensors and the closure rates against fixed obstacles or moving objects where those sensors are effective. Thus, the autonomous vehicle navigation, obstacle- and/or collision-avoidance functionality may employ echo sensors and/or visual sensors for distance/range measurement. For example, UAVs and MAVs may comprise sensors including those employing electroacoustic, optical, RADAR, and/or automatic, dependent surveillance-broadcast ("ADS-B") (e.g., an ADS-B receiver).

Autonomous vehicle navigation and/or an obstacle-avoidance system may be sensor-agnostic and process the collected data and fuse the gathered information (i.e., data) received from the various sensors to form a global environment estimate. Using the global environment estimate, features relevant to obstacle detection and navigation algorithms, or collision-avoidance algorithms, may be extracted and stored in a database. An algorithm bank may access the database in order to determine whether action must be taken to avoid a collision upon detection of a collision threat. The algorithm bank may also access the database in order to determine which action must be taken, if one is deemed necessary.

If an action is necessary, the autonomous vehicle navigation and/or obstacle-avoidance system may then interact with the preexisting vehicle infrastructure (e.g., an existing flight-control system) to prevent the collision. Indeed, the interface between the autonomous vehicle navigation and/or obstacle-avoidance system and an existing system may be vehicle-agnostic, thereby enabling it to be coupled with a variety of aerial vehicles, including preexisting aerial vehicles.

FIG. 1 shows an example environment 100 for autonomous navigation employing the presently disclosed obstacle-avoidance system, which may also be generally referred to as a dynamic collision-avoidance system, which may facilitate electronic bumper ("e-bumper") functionality. The environment 100 may include an objective 102, one or more roads 110 and any number of obstacles such as buildings 112, utility lines 114, utility poles 116, and trees 118. The environment 100 may further comprise, in addition, unanticipated obstacles 122 along the path, which may be dynamically detected using the dynamic collision-avoidance system. As illustrated, an aerial vehicle may be configured to follow one or more navigational paths (e.g., navigational paths 104, 106, 108) toward the objective 102, with each path being provided or determined via, for example, auto-pilot and configured to address one or more obstacles.

In accordance with at least one aspect, the aerial vehicle may be configured to dynamically avoid the unanticipated obstacles 122 using a dynamic collision-avoidance system, whether being guided under autopilot, or by remote control. Specifically, upon detection of collision threats (e.g., unanticipated obstacles 122), the dynamic collision-avoidance system may instruct the aerial vehicle, based on measurements received from, for example, a plurality of sensors, to override any commands from the autopilot or pilot (e.g., via the flight-control system) to avoid the unanticipated obstacles 122 and ultimately return to a navigational path.

Figure 2A:
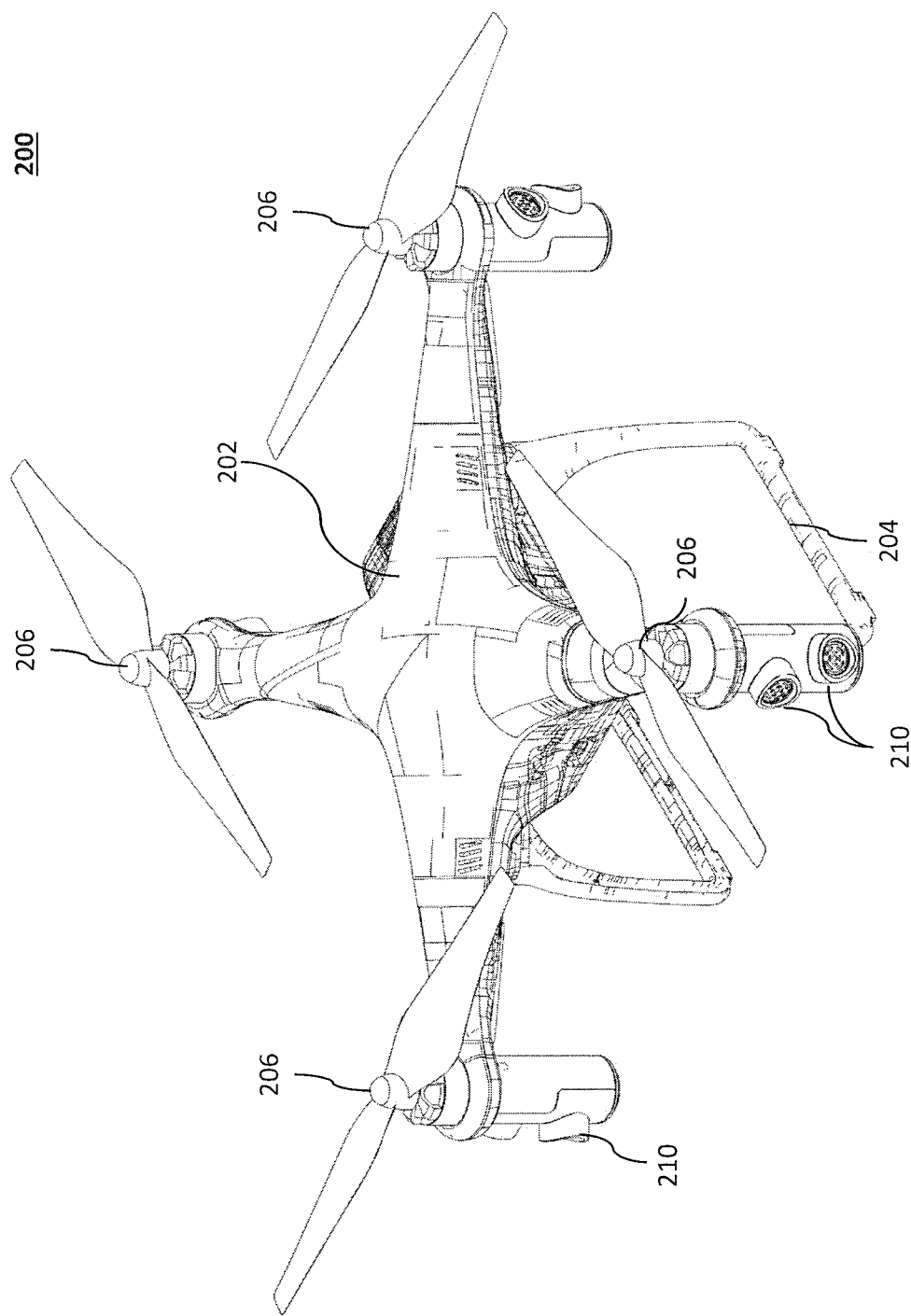
FIG. 2a illustrates a first example autonomous vehicle having a dynamic collision-avoidance system.
Figure 2B:
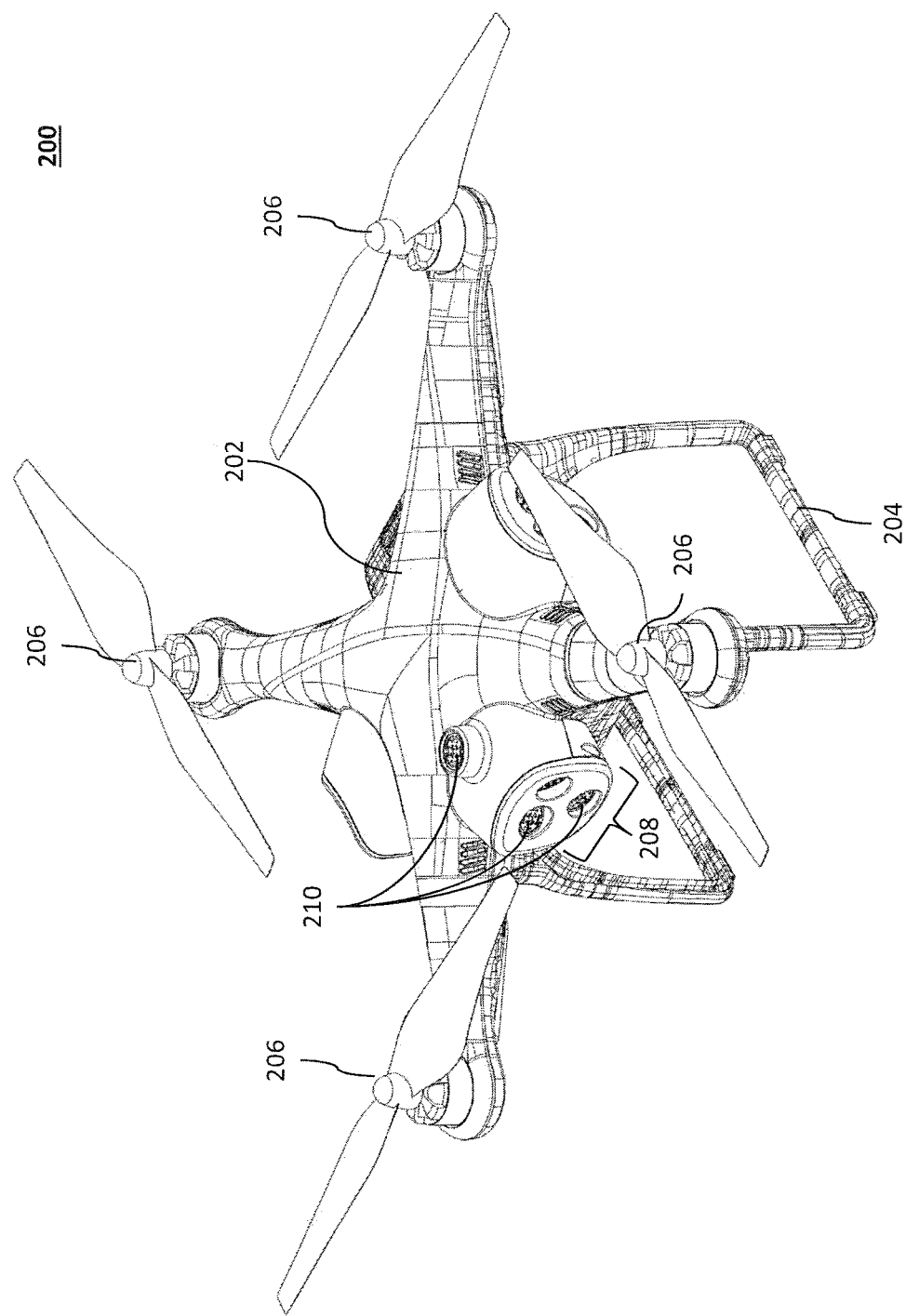
FIG. 2b illustrates a second example autonomous vehicle having a dynamic collision-avoidance system.

FIGS. 2a and 2b illustrate perspective views of a vehicle (e.g., an autonomous vehicle) suitable for use with a dynamic collision-avoidance system. The aircraft 200 illustrated in FIG. 2a may comprise an airframe 202, landing gear 204, an electronics module 300 (illustrated in FIG. 3), and one or more thrust generators 206 (e.g., a turbine, a motor or engine operatively coupled with a propeller, etc.). The electronics module 300 may be integrated with the airframe 202, or provided via a separate housing or pod. FIG. 2b illustrates a second vehicle that is substantially the same as the aircraft 200 of FIG. 2a; however, the sensors 210 of the second vehicle are positioned closer to the center of the vehicle and arranged in a separate housing 208. Specifically, while one may be suitable for certain uses, two or more separate housings 208 (e.g., retrofit navigation modules, such the described in connection with FIGS. 5a through 5c) may be positioned around the perimeter of the aircraft 200 to provide a field of view that is oriented with the aerial vehicle's line of flight. The separate housing 208 may be detachable from the airframe 202 and may be further configured to house the electronics module 300, or portion thereof (e.g., functioning as an electronics module 300 housing). Further, separate housing 208's functionality may be distributed in a suitable manner to not require modification to the original navigational components or structures permanent to the aerial vehicle.

Accordingly, the sensors 210 may be positioned on the aircraft 200 in a downward facing configuration as illustrated in FIG. 2c to detect obstructions below, a forward facing configuration as illustrated in FIG. 2d to detect obstructions ahead of the aircraft 200, or a combination thereof as illustrated in FIG. 2e. As can be appreciated, the sensors 210 may be further positioned on the sides, rear, and/or top of the aircraft 200 to detect obstacles and other threats in all directions relative to the aircraft 200. Thus, it should be appreciated that the sensor 210 location may be determined by the designer as needed for a particular purpose, sensor type, and/or operation; and therefore should not be limited to the layouts depicted in this disclosure. The landing gear 204 may be simple skids, as illustrated, or any other device capable of supporting the aircraft 200 when it is not flying, while allowing it to take off, land, and/or taxi without damage, such as wheels, skids, skis, floats, or a combination thereof. The landing gear 204 may also be retractable to reduce drag when in flight.

To facilitate controlled flight by adjusting roll, pitch, and yaw of the aircraft 200, the aircraft 200 may further comprise one or more steering mechanisms 304 or equivalent steering systems configured to receive a navigation command and to respond accordingly. To that end, a steering mechanism 304 may be operatively coupled with a controller or include one or more processors, actuators, motors, and/or other devices (e.g., electrical or electromechanical devices) capable of receiving and responding to a navigation command. Suitable steering mechanisms 304 include, without limitation, traditional flight-control surfaces (e.g., flaps, ailerons, elevators, rudders, spoilers, air brakes, and/or other flight-control surfaces), as well as other flight-control mechanisms, such as vectored-thrust control systems. Vectored-thrust control functionality may be facilitated by moving the thrust generators 206 to direct the thrust in a desired direction, thus controlling flight. For instance, an articulated, electric motor arrangement may employ vectored-thrust control to directly change the thrust vector. Indeed, independently articulating thrust-vectoring motor pods allow rapid transition between vertical and horizontal flight. In certain aspects, the aircraft 200 may further comprise two or more fins (e.g., vertical stabilizers, and/or horizontal stabilizers), particularly with regard to fixed-wing aerial vehicles.

The aircraft 200 may further comprise an intelligence, surveillance, reconnaissance ("ISR") payload for gathering data. For example, the aircraft 200 may be equipped with a payload pod comprising one or more cameras, audio devices, and other sensors. Any video, image, audio, telemetry, and/or other sensor data ("Surveillance Data"), collected by the UAV 106 may be locally stored or wirelessly communicated from the aircraft 200 to a remote location in real time using an antenna coupled with an onboard wireless communication device, such as a transmitter/receiver. Alternatively, Surveillance Data may be communicated, or otherwise transferred, to the remote location or another party via a wired connection (e.g., when tethered, or on the ground, post operation).

While the vehicles 200 depicted in FIGS. 2a through 2e are vertical-takeoff-and-landing ("VTOL") aerial vehicles, it will be understood that the autonomous vehicles described herein may include any vehicle, device, component, element, etc., that may be usefully navigated using the principles of the dynamic collision-avoidance system disclosed herein, including, without limitation, any unmanned vehicle, manned vehicle, aerial vehicle, ground vehicle, aquatic vehicle, space vehicle, remote-controlled vehicle, large vehicle, small vehicle, and so on, unless explicitly stated otherwise or clear from the text. For example, the autonomous vehicles described herein may include helicopters or other vehicles using horizontal propellers for lift, and so forth. The autonomous vehicles described herein may also, or instead, include aerial vehicles with forward flight capability, such as fixed-wing aerial vehicles. For additional information, other suitable autonomous vehicles are disclosed in greater detail by commonly owned U.S. Pat. No. 8,500,067, entitled "Modular Miniature Unmanned Aircraft With Vectored-Thrust Control," and U.S. Patent Publication No. 2015/0260526 "Autonomous Vehicle Navigation System And Method." U.S. Patent Publication No. 2015/0260526, for example, describes an aircraft and sensor payload to provide an improved navigational system that benefit from both cameras and echolocation sensors having overlapping fields of view.

Generally, an electronics module may be used to house the vehicle's avionics, power supply (e.g., a propulsion battery, generator, or the like), sensor payload, and communication device or system. As noted above, the electronics module may be integrated with the airframe 202 or contained within a separate housing, which may also potentially providing rigidity to the airframe 202. Thus, the electronics module may be removable from and replaceable to the airframe 202, and may house any systems or subsystems of the e-bumper and/or navigation system and methods as contemplated herein. The electronics module may comprise electronics and hardware used to support, or facilitate, the e-bumper and navigation system and methods. However, certain electronics and/or hardware may be configured outside of the electronics module housing. For instance, the aircraft 200 may further include one or more sensors 210 used to facilitate autonomous flight, which may include, without limitation, echolocation sensors, ultrasonic sensors, infrared sensors, RADAR, and the like. The sensors 210 may be appropriately installed on the aircraft 200 to enable functionality. For example, placement of certain sensors (e.g., those that are vision- or acoustic-based) may be configured on the aircraft 200 outside the electronics module housing (if used) because placement of certain sensors within the electronics module housing could hinder or prohibit sensor functionality. For instance, as illustrated in FIGS. 2a and 2b, sensors 210 may be positioned on the surfaces (e.g., top, bottom, edges, etc.) of the airframe 202 and/or atop the electronics module housing (e.g., separate housing 208).

The sensors 210 may employ one or more echolocation sensors, which generally function by emitting a sound frequency into an environment and detecting any echoes of the sound frequency that return from obstacles near the echolocation sensors. Using the strength of the echo and/or direction of echo's return, the echoes may be used to locate and/or identify obstacles, which in turn may cause the aerial vehicle to change direction to avoid collision with one or more obstacles.

Regardless of the type of sensors 210 employed, the dynamic collision-avoidance system may be configured to override, or attenuate, commands from a remotely situated pilot when such commands would cause the aircraft 200 to collide with an obstacle. Accordingly, the dynamic collision-avoidance system provides: (1) attenuation of operator inputs that would lead to a collision; and (2) if necessary, active reduction of the velocity component in the direction of the object.

To that end, the sensor may be positioned to obtain a field of view in the vehicle's direction of travel, thereby identifying potential obstacles in the aircraft 200's path. For example, a single sensor (or single group of sensors) may be provided at the front of the vehicle to detect a threat of collision (e.g., obstructions or obstacles) in the path of the vehicle. Moreover, a plurality of sensors 210 (or multiple groups of sensors) may be positioned around the perimeter (and/or top and bottom) of the aircraft 200 to provide a field of view that is oriented with the aircraft 200's line of flight. Accordingly, the plurality of sensors 210 would enable the aircraft 200 to detect a threat of collision on any side of the aircraft 200.

As described herein, the sensors 210 may include, inter alfa, any vision-based sensor or echolocation sensor known in the art or that will become known in the art, including, without limitation, ultrasonic sensors and the like. In one aspect, the cameras 206 may be used to identify larger objects through three-dimensional reconstruction techniques such as optical flow. While this may provide useful information for autonomous navigation, the processing latency associated with optical imaging, as well as the sensitivity to the visibility of various types of objects, may limit the utility of optical sensing techniques for detecting small, rapidly approaching objects in a line of flight of a vehicle. By orienting the sensors 210 toward the line of flight, acoustic detection may supplement optical detection and be used for detecting immediate obstructions that should trigger the execution of responsive maneuvers by a vehicle.

It will be appreciated that one purpose of the acoustic sensors is to provide immediate detection of obstacles directly in a flight path (or other line of travel), particularly obstacles that might not be detected using visual detection or other techniques. Correspondingly, it should be appreciated that one purpose of the sensors 210 is to provide immediate detection of obstacles in a specific direction (e.g., any direction of the vehicle), particularly obstacles that might not be readily detected using visual detection or other techniques. While an echolocation array operates well in this context, other sensor systems may also, or instead, be suitably employed for rapid, accurate detection of obstacles, such as laser-based techniques or any other suitable techniques using optical, acoustic, radio frequency, or other sensing modalities. Any such technique suitable for implementation in an autonomous vehicle and capable of accurately and quickly identifying obstructions may be used in place of the echolocation sensors in the systems and methods contemplated herein. Thus, the dynamic collision-avoidance system is generally sensor-agnostic, in that it can be configured to employ one of a variety of sensor technologies, or combination thereof. For example, the dynamic collision-avoidance system may employ a combination of vision- and acoustic-based sensors.

While the electronics module may be provided as a single housing, the electronics module may instead comprise multiple housings or "sub-housings." For example, the electronics module may be divided into two housings, a first housing for heavier components, such as the battery, and a second housing for the more delicate components, such as the avionics, surveillance payload, sensor payload, and any other electronic equipment. The components may be distributed, or divided amongst housings, to provide a desired weight distribution across the airframe 202.

A flight-control system may be used to control and/or navigate the aircraft 200. The flight-control system need not be a separate physical item on the vehicle, but rather may be a component of a larger navigation system or may itself include all of the components of the navigation system. Unless explicitly stated otherwise or clear from the text, any components described with reference to the navigation system may also be used by or included in the flight-control system and vice versa. In operation, the flight-control system may determine and/or instruct the aircraft 200 to follow a navigational path in order to reach a desired location based upon signals received from the components of the navigation system. For example, the flight-control system may facilitate autopilot functionality and/or respond to remote navigation commands. To that end, the flight-control system 306 may communicatively couple the aircraft 200 with a remote location, and may be configured to send and receive signals between (e.g., to and from) the aircraft 200 and the remote location. Functionality of the navigational module may be distributed in any suitable manner between components in the flight-control system, components elsewhere in the aircraft 200, and/or remotely located components. Moreover, a suitable electronic, mechanical, and communication interface may be provided to facilitate removal and replacement of the electronics module to the airframe 202.

Figure 3:
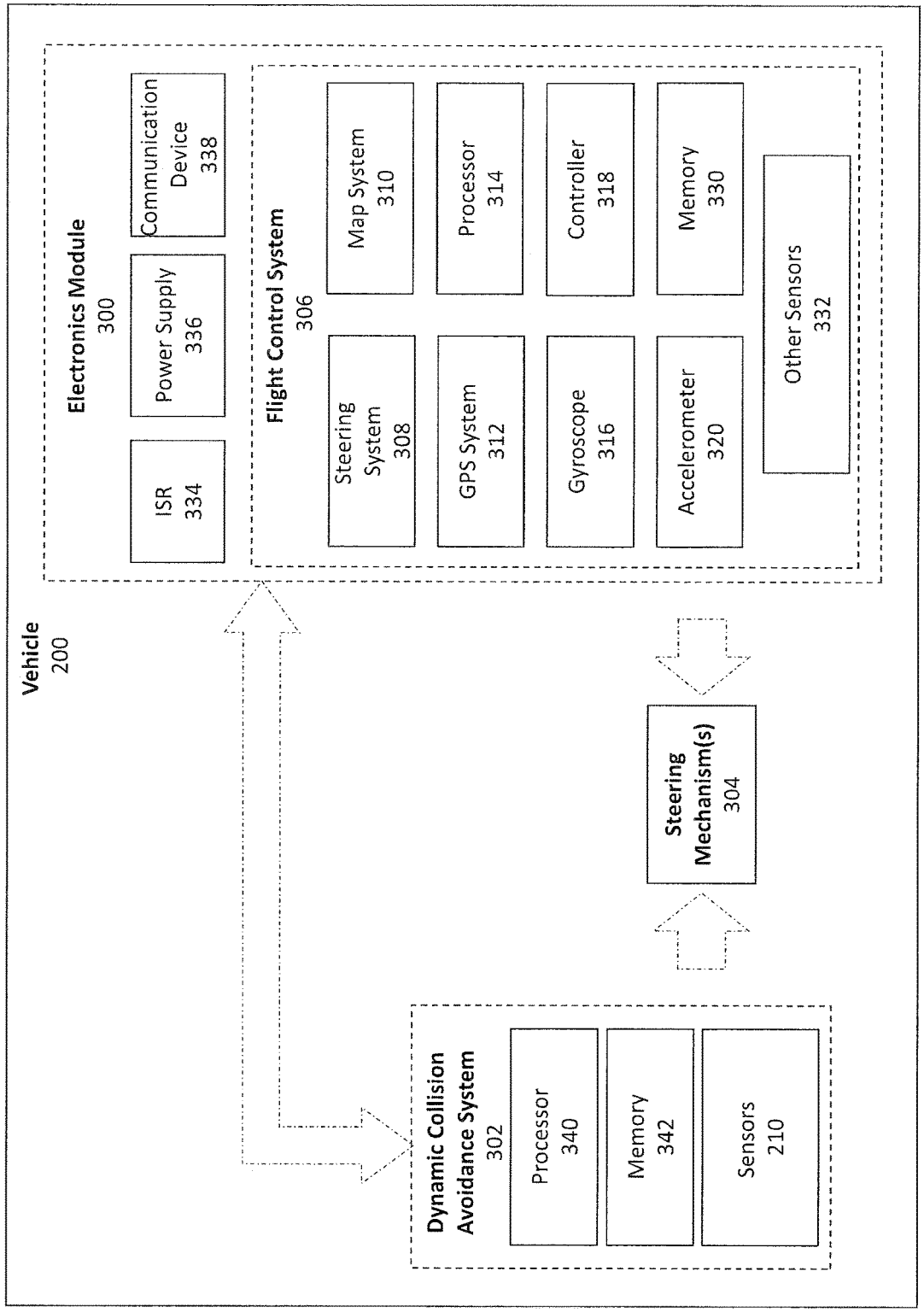
FIG. 3 is a block diagram of a dynamic collision-avoidance and navigation system for an autonomous vehicle.

FIG. 3 is a block diagram of an aircraft 200 (e.g., an autonomous vehicle) having a flight-control system 306, a dynamic collision-avoidance system 302, an electronics module 300, and a steering mechanism 304. More particularly, FIG. 3 illustrates the electronics module 300 as being used to house, or otherwise contain, the vehicle's flight-control system 306, power supply 336 (e.g., a propulsion battery), sensor payload (e.g., ISR payload 334) and communication device(s) 338. However, while a particular arrangement is illustrated in FIG. 3, it will be understood that the arrangement of components may vary. For example, the flight-control system 306 and/or the dynamic collision-avoidance system 302 may be located within one or more dedicated housings and/or removable from the aircraft 200. For example, the dynamic collision-avoidance system's functionality may by provide via a retrofit navigational module removably and non-permanently coupled to the vehicle (e.g., via the airframe). Such a retrofit navigational module may be configured to intercept and modify signals or navigation commands as disclosed herein.

Alternatively, the flight-control system 306 and/or the dynamic collision-avoidance system 302 may be integrated into the aircraft 200 and coupled in a communicating relationship with the electronics module 300 and/or steering mechanism 304. The flight-control system 306 and/or the dynamic collision-avoidance system 302 may, in certain embodiments, share components, such as memory, sensors, processors, or controllers. Further, the electronics module 300 may be removably coupled to the aircraft 200 or integrated into a fuselage or the like of the aircraft 200 in any desired manner. Thus, the arrangement of the various components may be configured as desired by the designer or operator and therefore should not be limited to a particular example described or illustrated herein. For example, flight-control system 306 and/or dynamic collision-avoidance system 302 may attach to an exterior of a vehicle, or be disposed wholly or partially within the vehicle. The flight-control system 306 and/or dynamic collision-avoidance system 302 may be a removable and replaceable package or a module that is removable from and replaceable to the vehicle, or be permanently coupled to or integrated into the vehicle.

A modular housing may encase one or more components of the electronics module 300, the flight-control system 306, and/or the dynamic collision-avoidance system 302. The modular housing may be constructed of plastic, metal, wood, a composite material, ceramic, or any material suitable for the purposes of a particular vehicle or type of vehicle. The modular housing may be detachable or ejectable, or it may be permanently coupled to the vehicle. The modular housing may be attached to the vehicle in any manner known to one of ordinary skill in the art. The modular housing may include openings for sensors such as the sensors 210.

Electronics Module 300. As discussed above, the electronics module 300 may be used to house the vehicle's 200 avionics (e.g., the flight-control system 206), power supply 336, sensor payload, such as an ISR payload 334, and communication device or system 338; and may be integrated with the airframe 202 or contained within a separate housing. In certain aspects, the electronics module 300 may further comprise the dynamic collision-avoidance system 300, or functionality thereof.

Steering Mechanism 304. The steering mechanism 304 may be configured to steer the aircraft 200 (whether autonomously or under manned control) on a navigational path to reach an objective as contemplated herein. The aircraft 200 may be any vehicle referenced herein or otherwise known in the art (or as will be known in the art). Similarly, the steering mechanism 304 may be any form of steering referenced herein or otherwise known in the art (or as will be known in the art). In general, the steering mechanism 304 responds to signals from the flight-control system 306, which may employ feedback or other control systems to accurately direct the aircraft 200 along an intended route.

As noted above, the steering mechanism 304 may include, for example, rudders at the rear of the aircraft 200, as well as elevators, and any other suitable control surfaces for vertical flight vehicles, along with associated cables, actuators, and so forth. The steering mechanism 304 may also, or instead, include any mechanism for steering an autonomous vehicle. For example, for aerial vehicles, the steering mechanism 304 may more generally include rudders, elevators, flaps, ailerons, spoilers, air brakes, and other control surfaces. For other aerial vehicles, such as a helicopter, the steering mechanism 304 may include a number of rotors, which may be fixed rotors or steerable rotors, along with foils and other control surfaces. The steering mechanism 304 may also include articulated, electric motors employing vectored-thrust control to directly change the thrust vector. For land-based vehicles, the steering mechanism 304 may include a rack and pinion system, variably rotatable treads, a recirculating ball system, and the like. The steering mechanism 304 may also, or instead, include any components to provide thrust, acceleration, and deceleration of the aircraft 200, along with directional control. While vehicles may generally use separate or integrated components for drive and direction, all such combinations that facilitate control over movement of a vehicle are intended to fall within the scope of a "steering mechanism" as contemplated herein.

Dynamic Collision-Avoidance System 302. The e-bumper module generally includes circuitry to facilitate the obstacle-avoidance system's e-bumper functionality. Indeed, the flight-control system 306 and a dynamic collision-avoidance system 302 may cooperate to provide an obstacle-avoidance system. As disclosed herein, the dynamic collision-avoidance system 302 may include one or more sensors 210, where each sensor 210 may have an acoustic field of view ("FOV"). However, the sensors 210 may be any of the echolocation sensors referenced herein or otherwise. Using these sensors 210, the dynamic collision-avoidance system 302 may detect an unanticipated obstacle 122 and communicate responsive navigation commands to said flight-control system 306 in order to avoid said unanticipated obstacle 122.

The dynamic collision-avoidance system 302's functionality may be facilitated via flight-control system 306, or an independent system, using a processor 340 (or other comparable logic), memory 342, and one or more sensors 210 (e.g., acoustic sensors, visual sensors, or a combination thereof) positioned along the top, bottom, and/or perimeter (e.g., one or more edges) of the aircraft 200's airframe 202, as illustrated in, for example, FIGS. 2a and 2b. The dynamic collision-avoidance system 302 may be used to reduce the likelihood of collisions with obstacles in any orientation of the aircraft 200, and for any relative location of objects to the vehicle. More specifically, a dynamic collision-avoidance system 302 may be provided through a plurality of sensors 210, which may be used to detect various obstacles. In general, the dynamic collision-avoidance system 302 may communicate directly with the steering mechanism 304 (or via a controller) and/or with the flight-control system 306, in order to provide, e.g., sensed data from the sensors 210 and/or derivative commands (e.g., a modified navigation command, such as an alternative navigation path, attenuated navigation signal, or a responsive maneuver, which may be a control command responsive to the sensed data or global environment estimate value and configured to avoid an unanticipated obstacle 122). Accordingly, the dynamic collision-avoidance system 302 is particularly useful in missions involving operation in close proximity to obstacles.

Certain benefits and contributions of the dynamic collision-avoidance system 302 include: (1) the sensor-agnostic method which may be used to generate the global environment estimate based on individual sensor inputs, (2) the sensor-agnostic method which may be used to interface with the existing vehicle control infrastructure in a vehicle-agnostic approach, and (3) the navigation algorithms necessary to fulfill the e-bumper functionality. For instance, the dynamic collision-avoidance system 302 may be integrated into the aircraft 200 and coupled in a communicating relationship with the steering mechanism 304, the flight-control system 306, an optical system, sensors 210, or combination thereof.

The dynamic collision-avoidance system 302 is also advantageous in that it employs a relatively straightforward state machine to activate, scale, or deactivate the influence of each component-operator input, proportional-integral-derivative ("PID") on distance, autopilot commands, etc.—in response to the distance from the object, thereby reducing risk of error. Further, a complete state machine estimate can be assembled with as little as four echolocation sensors. However, in certain embodiments (e.g., when only one direction needs be monitored), an obstacle-avoidance system may be provided using only a single sensor placed on the front end of the vehicle. Another advantage of the dynamic collision-avoidance system 302, as disclosed herein, is that the dynamic collision-avoidance system 302 does not require any cooperative target sensors. That is, corresponding sensors need not be placed on obstacles, thereby greatly enhancing the utility of the dynamic collision-avoidance system 302. Further, the dynamic collision-avoidance system 302 does not require aerial vehicle data information or collision-avoidance algorithms.

A variety of physical configurations are possible and the dynamic collision-avoidance system 302 may also, or instead, be integrated with the vehicle 300, the flight-control system 306, or include any components described herein. To that end, as discussed with regard to FIGS. 2a and 2b, sensors 210 may be integrated within the vehicle 300's shell. Integration of sensors 210 offers a number of advantages. For example, the integration of sensors 210 provides a compact package (e.g., in size and weight), while avoiding echolocation sensor interference (cross talking), as well as/along with avoiding electromagnetic interference ("EMI") and propeller acoustic noise. Moreover, the aircraft 200 shell allows for precise placement, low drag, and easy swap of sensors 210 (e.g., if a sensor becomes damaged or if it is otherwise desirable to replace/upgrade the sensor). For example, a recess may be provided within the shell of the vehicle for one or more sensors, thereby mitigating unwanted drag. The sensor may be further covered with a protective cover. The protective cover should, however, be configured to not inhibit the sensors' functionality/reliability. For example, when acoustic-based sensors are employed, the protective cover should be acoustically invisible (e.g., a fabric or a reflector having tiny, regularly spaced holes covered by a thin, elastic membrane). One example of an acoustically invisible reflector material is described by Jong Jin Park, et al., in the publication entitled, "Giant Acoustic Concentration by Extraordinary Transmission in Zero-Mass Metamaterials," Phys. Rev. Lett. 110, 244302 (published Jun. 13, 2013). Similarly, when vision-based sensors are employed, the protective cover should transparent or otherwise designed to permit visibility.

Although the current dynamic collision-avoidance system 302 is described as using echolocation sensors as sensors 210, the dynamic collision-avoidance system 302 may employ measurements received from any sensor (whether echolocation sensors or another type described herein, without limitation thereto) and fuses the received data to create a global environment estimate. From that global environment estimate, features of interest to the algorithms may be extracted and stored in a target database. The global environment estimate may be an abstracted summary of what the sensors are detecting around the aircraft. For example, if multiple sensors are available that provide a measurement of the same state (e.g., range to an obstacle) it fuses those states. If multiple sensors are available that provide multiple distinct states (e.g., range to, and velocity/closure rate of obstacle). By instantiating this global environment estimate as an abstracted summary of the sensed data, as discussed above, it serves as a single interface accessible by the bank of algorithms.

This target database may serve as a common interface for any algorithm that may be used by the dynamic collision-avoidance system 302 or another autonomous vehicle navigation or obstacle-avoidance system. In the case of the dynamic collision-avoidance system 302, objects that are determined to pose a collision threat are passed to the dynamic collision-avoidance system 302-specific algorithms.

As discussed above, the dynamic collision-avoidance system 302 may be integrated with the aircraft 200 via a flight-control system 306's vehicle control interface, without modifying the existing systems on the aircraft 200, and without requiring knowledge of the state of the vehicle's autopilot (or manned control). For instance, an embedded logic device or processor 340, such as an Arduino© microprocessor, may (1) intercept the original navigation commands (e.g., flight commands by a pilot or autopilot), (2) attenuate in accordance with a predetermined e-bumper algorithm, and (3) feed new or modified navigation commands (e.g., attenuated commands generated by the dynamic collision-avoidance system) to the vehicle's flight-control system 306 (e.g., autopilot) or steering mechanism 304 as replacement or override navigation commands. In addition, the dynamic collision-avoidance system 302 may intercept the control signals (e.g., navigation commands) from the autopilot to the thrust generators 206 (e.g., an electric motor via pulse-width modulation ("PWM") signals) and modify those signals prior to sending them to the flight-control system 306 and/or thrust generators 206 (e.g., motors, turbines, etc.). A benefit of the presently disclosed dynamic collision-avoidance system 302 is that it achieves the objective of obstacle avoidance without requiring alterations to the aircraft 200—that is, the dynamic collision-avoidance system 302 is vehicle-agnostic. In certain aspects, because significant delays in the system can result in undesirable operation of the aircraft 200, the software implemented on the dynamic collision-avoidance system 302's embedded device may be constantly monitored for execution speed.

With the global environment estimate and vehicle control interface in place and tuned, the dynamic collision-avoidance system 302 may focus on navigation commands (such as those by a pilot or autopilot) that would cause the vehicle to crash into an object. The PID distance controller may also able to hold position and reject unwanted operator input (e.g., obstacle avoidance). Pilot inputs (e.g., navigation commands) may be rejected or modified with high-pass, low-pass, and band-pass filters, feed-forward approaches, and high-gain integrators. In addition, gain-scheduling techniques are implemented for robust controllability. For example, in the case where the vehicle approaches the unanticipated obstacles 122 due to control inputs by the vehicle's operator, the dynamic collision-avoidance system may reduce the effectiveness of those control inputs as a function of the distance to the object. If the vehicle continues to approach the unanticipated obstacles 122, the dynamic collision-avoidance system eventually completely attenuates all control inputs in the direction of the object and/or actively reduces the velocity with which the object is approached. Similarly, if the vehicle is moved toward an object due to environmental conditions (e.g., winds or gusts) to create a collision hazard, the dynamic collision-avoidance system provides navigation commands to ensure that the vehicle's position does not drop below a predetermined safe distance from the object. The attenuation may be adjusted such that the dynamic collision-avoidance system reduces the effectiveness of those control inputs (e.g., navigation commands) as a function of the distance to the object. For example, an inverse distance-attenuation function may be employed whereby, as the distance between the vehicle and the object decreases, the control input attenuation increases such that the control inputs are effectively decreased, disregarded, or reversed. Further, in certain situations, the dynamic collision-avoidance system can be engaged to maintain the vehicle at a fixed distance from an object to allow that object to be systematically surveyed at close range without danger of influencing the unanticipated obstacles 122. The dual-mode capability of the dynamic collision-avoidance system 302, which includes both the capability to hold distance relative to object or perform obstacle avoidance during flight, makes the dynamic collision-avoidance system 302 useful to a wide range of operators. That is, holding a distance between the vehicle and the object is advantageous for data collection while obstacle avoidance assists inexperienced pilots.

The dynamic collision-avoidance system 302 may further include an armed/disarmed feature. The armed/disarmed feature may be used, for example, to prevent the e-bumper controller from erroneously signaling a collision upon detecting the ground during launch or landing. Indeed, the safety measures to arm and disarm the dynamic collision-avoidance system 302 at various phases of the flight, takeoff, and landing further increase robustness and safety of the aircraft 200. For example, the dynamic collision-avoidance system 302 may be manually actuated by the controller (e.g., a pilot operating the vehicle), or automatically armed/disarmed depending on the distance, position, altitude, flight time, etc. of the vehicle. In certain aspects, the dynamic collision-avoidance system 302 may be configured to switch between one of a plurality of operation modes. The desired operation mode may be selected using, for example, a physical switch positioned on the aerial vehicle, remotely via an operator interface/device (e.g., via a remote controller/ground point), or the like. Example operation modes include, without limitation, a disabled mode (i.e., the system is off), a precision mode, a performance mode, etc. For example, in precision mode, the dynamic collision-avoidance system 302 may enable features such as auto-takeoff, rejection of erroneous operator inputs, obstacle avoidance, precision control of the aircraft through adjusted input control/aircraft response mapping, etc. Precision mode may also be designed to allow the UAV to approach to obstacles closer than in performance mode (e.g., about 1 to 10 feet, more preferably about 3-7 feet, or about 4.5 ft.). In performance mode, the dynamic collision-avoidance system 302 may provide the same benefits as precision mode, but be optimized for faster flight regimes. For example, in performance mode, the aircraft may avoid obstacles at a greater distance than the performance mode. Additionally, the avoidance maneuver may be more aggressive than the maneuver in precision mode to protect against higher operational velocities.

Flight-Control System 306. The flight-control system 306 may determine one or more navigational paths for the aircraft 200 to reach a desired location based upon signals received from the components of a navigation system. The flight-control system 306 may calculate, generate, and send navigation commands (e.g., data signals) to the steering mechanism 304 to direct the aircraft 200 along a navigational path to the desired location. The flight-control system 306 may be disposed wholly or partially inside a separate housing, inside the airframe 202, or some combination thereof. The flight-control system 306 may further include any of the components of the dynamic collision-avoidance system 302 or flight-control system 306 described, for example, with reference to FIG. 3. Indeed, the flight-control system 306 and a dynamic collision-avoidance system 302 are generally configured to direct, or otherwise control, one or more steering mechanisms 304 within an aircraft 200. The flight-control system 306 may be coupled in a communicating relationship with the aircraft 200 and a remote location and may be configured to send and receive signals to and from the aircraft 200 and the remote location via communication device 338. Communication device 338 may be, for instance, a wireless transceiver and antenna.

In general, the flight-control system 306 may include a steering system 308, a map system 310, a GPS system 312, a processor 314, a gyroscope 316, a controller 318, an accelerometer 320, and/or a memory 330. The flight-control system 306 may also include the components described above as being disposed within the electronics module 300 housing, as well as other sensors 332, such as any other conventional flight instrumentation, sensors, processing circuitry, communications circuitry, optical system including cameras and the like, necessary or useful for operation of an unmanned aerial vehicle or other autonomously or manually piloted vehicle. One or more of the flight-control system 306's components may be housed within the electronics module 300 housing.

The flight-control system 306 may be communicatively coupled with the one or more steering mechanisms 304 and/or the dynamic collision-avoidance system 302. For instance, the steering system 308 may be configured to receive signals from the flight-control system 306 (or dynamic collision-avoidance system 302) and provide suitable control signals to the steering mechanism 304 of the vehicle in order to direct the aircraft 200 along an intended route.

The map system 310 may be part of a map-based flight-control system that provides positional information about natural and manmade features within an area. This may include information at any level of detail including, e.g., topographical maps, general two-dimensional maps identifying roads, buildings, rivers, and the like, or detailed, three-dimensional data characterizing the height and shape of various natural and manmade obstructions such as trees, sculptures, utility infrastructure, buildings, and so forth. In one aspect, the map system 310 may cooperate with an optical system for visual verification of surrounding context or the map system 310 may cooperate with the GPS system 312 to provide information on various obstacles within an environment for purposes of path determination or the like. In one aspect, the map system 310 may provide a supplemental navigational aid in a GPS-denied or GPS-impaired environment. When GPS is partially or wholly absent, the map system 310 may cooperate with other sensors 332, such as optical sensors, inertial sensors, and so forth to provide positional information until a GPS signal can be recovered.

The map system 310 may more generally communicate with other components of the flight-control system 306 in order to support navigation of a vehicle as contemplated herein. While this may include providing map information for calculation of routes, this may also include independent navigational capabilities. For example, the map system 310 may provide a map-based navigation system that stores a map of an operating environment including one or more objects. The map-based navigation system may be coupled to cameras and configured to determine a position of a vehicle by comparing stored objects to a visible environment, which may provide position data in the absence of GPS data or other positional information.

The GPS system 312 may be part of a global positioning system configured to determine a position of the electronics module 300 or the aircraft 200. The GPS system 312 may include any GPS technology known in the art or that will become known in the art, including conventional, satellite-based systems as well as other systems using publicly or privately operated beacons, positional signals, and the like. The GPS system 312 may include one or more transceivers that detect data for use in calculating a location. The GPS system 312 may cooperate with the other components of the flight-control system 306 to control operation of the aircraft 200 and navigate the vehicle along an intended path.

The gyroscope 316 may be a device configured to detect rotation of the electronics module 300 or the aircraft 200 to which the electronics module 300 is coupled. The gyroscope 316 may be integral with the aircraft 200 or it may be disposed inside or outside of the electronics module 300 housing. The gyroscope 316 may include any gyroscope or variations thereof (e.g., gyrostat, microelectromechanical systems ("MEMS"), fiber-optic gyroscope, vibrating-structure gyroscope, dynamically tuned gyroscope, and the like) known in the art or that will become known in the art. The gyroscope 316 may cooperate with the other components of the flight-control system 306 to control operation of the aircraft 200 and navigate the vehicle along an intended path.

The accelerometer 320 may be any device configured to detect a linear motion of the electronics module 300 or the aircraft 200. The accelerometer 320 may be integral with the aircraft 200 or it may be disposed inside or outside of the electronics module 300 housing. The accelerometer 320 may include may include any accelerometer known in the art (e.g., capacitive, resistive, spring-mass base, direct current ("DC") response, electromechanical servo, laser, magnetic induction, piezoelectric, optical, low frequency, pendulous integrating gyroscopic accelerometer, resonance, strain gauge, surface acoustic wave, MEMS, thermal, vacuum diode, and the like) or that will become known in the art. The accelerometer 320 may cooperate with the other components of the flight-control system 306 to control operation of the aircraft 200 and navigate the vehicle along an intended path.

Other sensors (or sensor systems) 332 or sensors 210 may also be similarly employed. For example, the aircraft 200 (or the flight-control system 306, dynamic collision-avoidance system 302, or electronics module 300 of the vehicle) may employ infrared sensors, RADAR (i.e., RAdio Detection And Ranging) sensors, LiDAR (i.e., Light Detection and Ranging) sensors, and so forth. Any of the foregoing may be used alone or in combination with other systems and sensors described herein to augment vehicle navigation. The processor 314 may be coupled in a communicating relationship with the controller 318, the aircraft 200, the flight-control system 306, the steering mechanism 304, and the other various other components, systems, and subsystems described herein. The processor 314 may be an internal processor of the aircraft 200 or the flight-control system 306, an additional processor within the electronics module 300 to support the various navigational functions contemplated herein, a processor of a desktop computer or the like, locally or remotely coupled to the aircraft 200, and the flight-control system 306, a server or other processor coupled to the aircraft 200 and the flight-control system 306 through a data network, or any other processor or processing circuitry. In general, the processor 314 may be configured to control operation of the aircraft 200 or the flight-control system 306 and perform various processing and calculation functions to support navigation. The processor 314 may include a number of different processors cooperating to perform the steps described herein, such as where an internal processor of the aircraft 200 controls operation of the aircraft 200 while a processor in the housing preprocesses optical and echolocation data.

The processor 314 may be configured to determine or revise a navigational path for the aircraft 200 to a location based upon a variety of inputs including, e.g., position information, movement information, dynamic collision-avoidance system 302 data, and so forth, which may be variously based on data from the GPS system 312, the map system 310, the gyroscope 316, the accelerometer 320, and any other navigation inputs, as well as an optical system and the echolocation system, which may provide information on obstacles in an environment around the aircraft 200. An initial path may be determined, for example, based solely on positional information provided by the GPS system 312, with in-flight adjustments based on movements detected by the gyroscope 316, accelerometer 320, and the like. The processor 314 may also be configured to utilize an optical navigation system, where the processor is configured to identify a visible obstacle within the FOV of an optical system; for example, using optical flow to process a sequence of images and to preempt the GPS system 312 to navigate the aircraft 200 around visible obstacles and toward the location. The processor 314 may be further configured to identify an obstacle within the FOV of the dynamic collision-avoidance system 302, usually within a line of flight of the vehicle, and further configured to preempt the GPS system 312 and the optical navigation system to execute a responsive maneuver that directs the aircraft 200 around the obstacle and returns the aircraft 200 to a previous course toward the location.

The controller 318 may be operable to control components of the aircraft 200 and the flight-control system 306, such as the steering mechanism 304. The controller 318 may be electrically or otherwise coupled in a communicating relationship with the processor 314, the aircraft 200, the flight-control system 306, the steering mechanism 304, and the other various components of the devices and systems described herein. The controller 318 may include any combination of software and/or processing circuitry suitable for controlling the various components of the aircraft 200 and the flight-control system 306 described herein, including, without limitation, microprocessors, microcontrollers, application-specific integrated circuits, programmable gate arrays, and any other digital and/or analog components, as well as combinations of the foregoing, along with inputs and outputs for communicating control signals, drive signals, power signals, sensor signals, and so forth. In one aspect, this may include circuitry directly and physically associated with the aircraft 200 and the flight-control system 306, such as an on-board processor. In another aspect, this may be a processor, such as the processor 314 described herein, which may be associated with a personal computer or other computing device coupled to the aircraft 200 and the flight-control system 306, e.g., through a wired or wireless connection. Similarly, various functions described herein may be allocated among an on-board processor for the aircraft 200, the flight-control system 306, and a separate computer. All such computing devices and environments are intended to fall within the meaning of the term "controller" or "processor" as used herein, unless a different meaning is explicitly provided or otherwise clear from the context.

The memory 330 may include local memory or a remote storage device that stores a log of data for the flight-control system 306, including, without limitation, the location of sensed obstacles, maps, images, orientations, speeds, navigational paths, steering specifications, GPS coordinates, sensor readings, and the like. The memory 322 may also, or instead, store a log of data aggregated from a number of navigations of a particular vehicle, or data aggregated from a number of navigations of different vehicles. The memory 322 may also, or instead, store sensor data from an optical system and dynamic collision-avoidance system 302, related metadata, and the like. Data stored in the memory 330 may be accessed by the processor 314, the controller 318, a remote processing resource, and the like.

Figure 4:
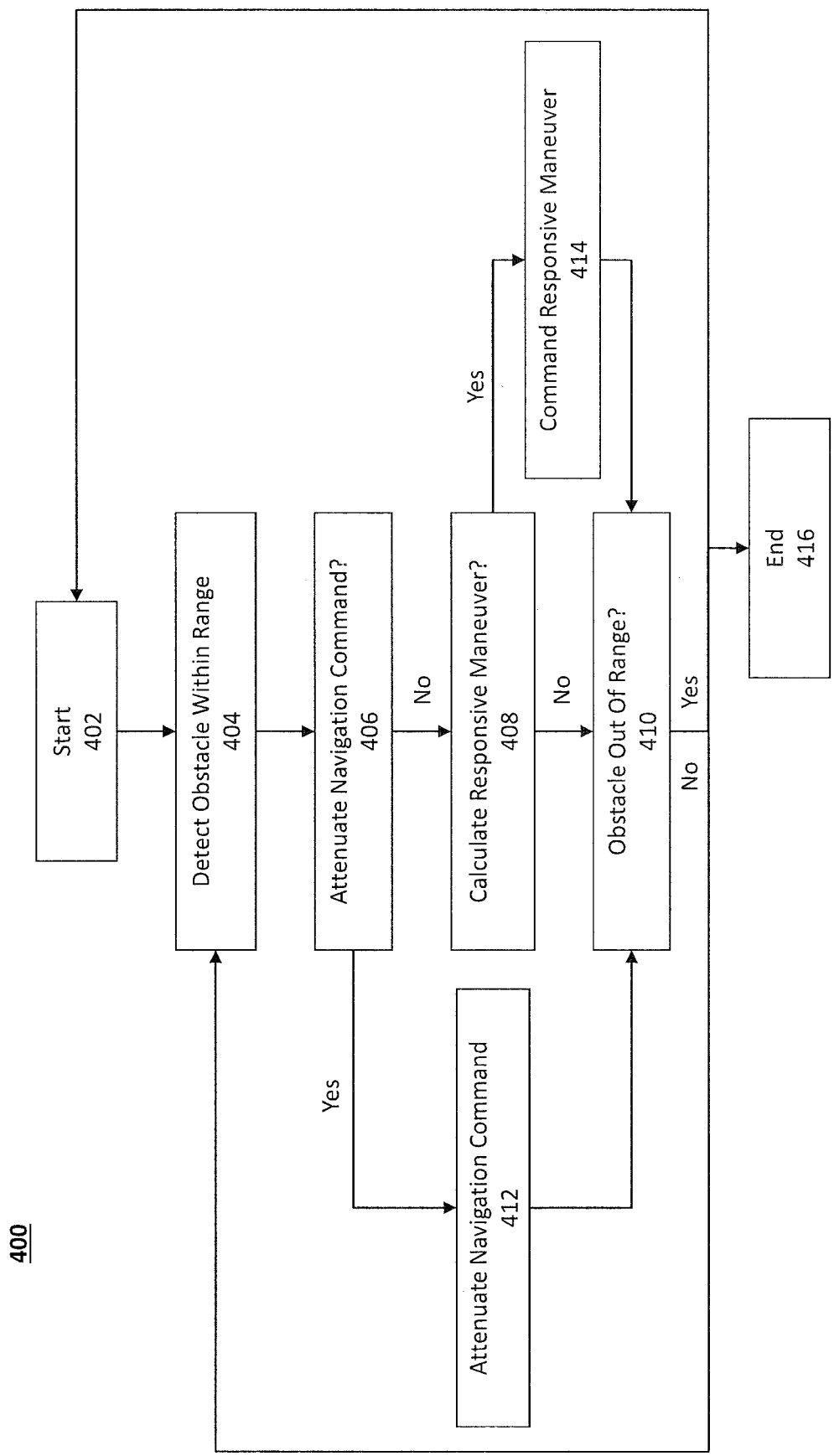
FIG. 4 is a flow chart of a method for using a dynamic collision-avoidance system when navigating a vehicle from a position to an objective.

FIG. 4 is a flow chart of a method 400 for navigating a vehicle using the dynamic collision-avoidance system. The dynamic collision-avoidance system starts, or is activated, at step 402. Once activated, the dynamic collision-avoidance system monitors the environment (e.g., in each direction of freedom) using one or more sensors. As discussed above, the sensors may be, for example, echolocation sensors. As shown in step 404, the method 400 may include detecting an unanticipated obstacle 122.

As shown in step 404, the method 400 may include detecting an obstacle using one or more echolocation sensors (or other suitable sensor). Step 404 may include outputting acoustic signals, detecting echoes of those acoustic signals, and using the detected echoes to determine the size and location of the obstacle. In general, this may be any obstacle capable of detection through auditory flow that blocks, partially blocks, obscures, endangers, etc., the navigational path of the vehicle from the position to the objective. The obstacle may be any physical obstacle such as a building, tree, power line, rock, and so forth. More generally, the first obstacle may be any location or path that the vehicle should avoid.

As shown in step 406, the method 400 may include determining whether to attenuate the navigation commands. The decision as to whether to attenuate the navigation commands at step 412 or to calculate a responsive maneuver at step 408 may be based upon the distance of the obstacle. For example, if the distance to the obstacle is meets or exceeds a predetermined distance threshold, the dynamic collision-avoidance system's processor may attenuate the navigation commands at step 412. If the distance to the obstacle is less than a predetermined distance threshold, thus suggesting a more imminent collision, the dynamic collision-avoidance system's processor may calculate responsive maneuver at step 408.

As shown in step 412, the method 400 may include attenuating the navigation commands. For example, in a case where the vehicle approaches the obstacles due to control inputs by the vehicle's operator or autopilot, the dynamic collision-avoidance system may adjust the control inputs based on the distance to the object. If the vehicle continues to approach the obstacles, the dynamic collision-avoidance system may eventually completely reject all control inputs in the direction of the object and/or actively reduce the velocity with which the object is approached.

As shown in step 414, the method 400 may include calculating a responsive maneuver that avoids the obstacle. In one aspect, the responsive maneuver may be a predetermined responsive maneuver that provides a temporary excursion from the revised course and returns immediately to the revised course after the responsive maneuver has been executed. In another aspect, this may include selecting from among a number of predetermined responsive maneuvers according to information about the obstacle or dynamically creating a responsive maneuver according to feedback from the echolocation system. Where appropriate, the responsive maneuver may be further adapted to other data such as GPS data, optical data, or other sensor data in order to better respond to the context of the detected obstacle. However calculated, instructions for the responsive maneuver may be transmitted to a steering system for the vehicle for corresponding execution.

As shown in step 410, the method 400 may include determining whether the obstacle is out of range, as a result of the attenuation at step 412 or the responsive maneuver at step 414. If the obstacle is out of range, the method 400 may end at step 416, or, in the alternative, restart at step 402 to avoid future obstacles. If the obstacle is still in range, the method 400 may return to step 404.

RADAR Flight Control/Collision Avoidance (RFCA) Module 500. The dynamic collision-avoidance system 302 may be embodied as a RADAR flight control/collision avoidance (RFCA) module 500 that uses RADAR as one of the sensors 210, such as a micro-RADAR sensor with a rectangular beam shaper. As illustrated in FIGS. 5a through 5c, the RFCA module 500 may include a radio-frequency large-scale-integration (RFLSI) component 502, a microcontroller (MCU) 508 coupled with one or more memory devices 504 (e.g., RAM and ROM) and one or more of the sensors 210, a cable input 506, such as a USB on-the-go connector, and an interface connector 510 to the aircraft 200. The RFCA module 500 may further comprise various electronic components 512 for signal and voltage handling (e.g., capacitors, inductors, LDO regulators, etc.). The one of the sensors 210 (e.g., micro-RADAR sensor with a rectangular beam shaper) may be located on the same PCB 514 or remotely situated and coupled to the PCB 514 via electronic conductors or a wireless transceiver.

The interface connector 510 may provide power and universal asynchronous receiver/transmitter (UART) functionality between the RFCA module 500 and the aircraft 200. The RFCA module 500 is preferable compact and, due in part to being vehicle and sensor agnostic, configured to serve as a retrofit that couples with an existing flight control system 306 and/or steering mechanism(s) 304 of an aircraft 200 via the interface connector 510. In operation, sensors 210 provide inputs measurements to micro-controller 508, which is configured to run one or more software programs (e.g., navigation, altitude hold, landing assist, and collision protection software/functions). The micro-controller 508 outputs commands to the flight control system 306 of the aircraft 200. The RFCA module 500 is advantageous in that it offers a reliable and flexible architecture that may operate as a single module to capture raw data (e.g., from one or more sensors 210), signal processing, and detection algorithms. The data communication between the RFCA module 500 and the aircraft 200 may be facilitated via a single bi-directional communication channel, which may be configurable through, for example, a MAVLink application program interface (API).

The RFCA module 500 may be installed on the aircraft 200 in a downward facing configuration, a forward facing configuration, or a combination thereof. In a downward facing configuration, as illustrated in FIG. 2c, the RFCA module 500 may facilitate altitude hold and landing assist functions (e.g., via a landing assist module). For example, the RFCA module 500 may commands the aircraft 200, via the altitude hold function, to maintain a predetermined altitude to obstructions detected below (from the ground), or, in the landing assist function, command the aircraft 200 to perform a landing maneuver to avoid an obstruction detected below. In the forward facing configuration, as illustrated in FIG. 2d, the RFCA module 500 offers collision protection by commanding flight maneuvers in forward direction to prevent collision with a detected obstruction (e.g., serving as a brake). Preliminary testing reveals that the RFCA module 500 offers a range of 1-10 meters, a speed of up to 5 m/s, an update rate at 40 Hz, fields of view (FOV) of 70° (forward facing configuration) and 60° (downward facing configuration), a resolution of 8 cm, with the objects detected being the closest object, whether stationary or moving.

The RFCA module 500 is preferably compact and lightweight, thereby minimizing the load and imposition on the aircraft 200. For example, an RFCA module 500 may have a length (L) of between 10 mm and 50 mm, more preferably, between 20 mm and 40 mm, most preferably about 30 mm, while the width (W) may be between 10 mm and 40 mm, more preferably, between 15 mm and 30 mm, most preferably about 20 mm, with a height (11) between 1 mm and 10 mm, more preferably, between 3 mm and 7 mm, most preferably about 5 mm. An RFCA module 500 with having 20×30×5 mm, for example, has shown to have a weight of less than 25 grams and a power consumption that is less than 1 watt (W).

Three-Region Collision Protection Function. In certain aspects, the processor 340 of the dynamic collision-avoidance system 302 may execute a three-region collision protection function with a pilot override feature. In certain aspects, however, a separate module including circuitry to facilitate the three-region collision protection function may be provided. The three-region collision protection function provides a sensor and aircraft agnostic technique for preventing headlong collision of the aircraft 200 with objects within its environment/range. In other words, the three-region collision protection function provides a "detect and avoid" capability and/or a "sense and avoid" capability to an aircraft 200, which is essential to aircraft navigation, whether via pilot or autonomous flight.

An advantage of an aircraft 200 employing the three-region collision protection function (e.g., via the three-region collision protection algorithm 600) is the ability to exploit low cost and low fidelity range measurements to provide an effective collision protection system for an aircraft 100 being actively piloted. The three-region collision protection function is also able to scale the sensor input from the one or more sensors 210, while remaining both sensor and aircraft agnostic in its design, thereby enabling the three-region collision protection function to be employed with virtually all aircraft.

Figure 6A:
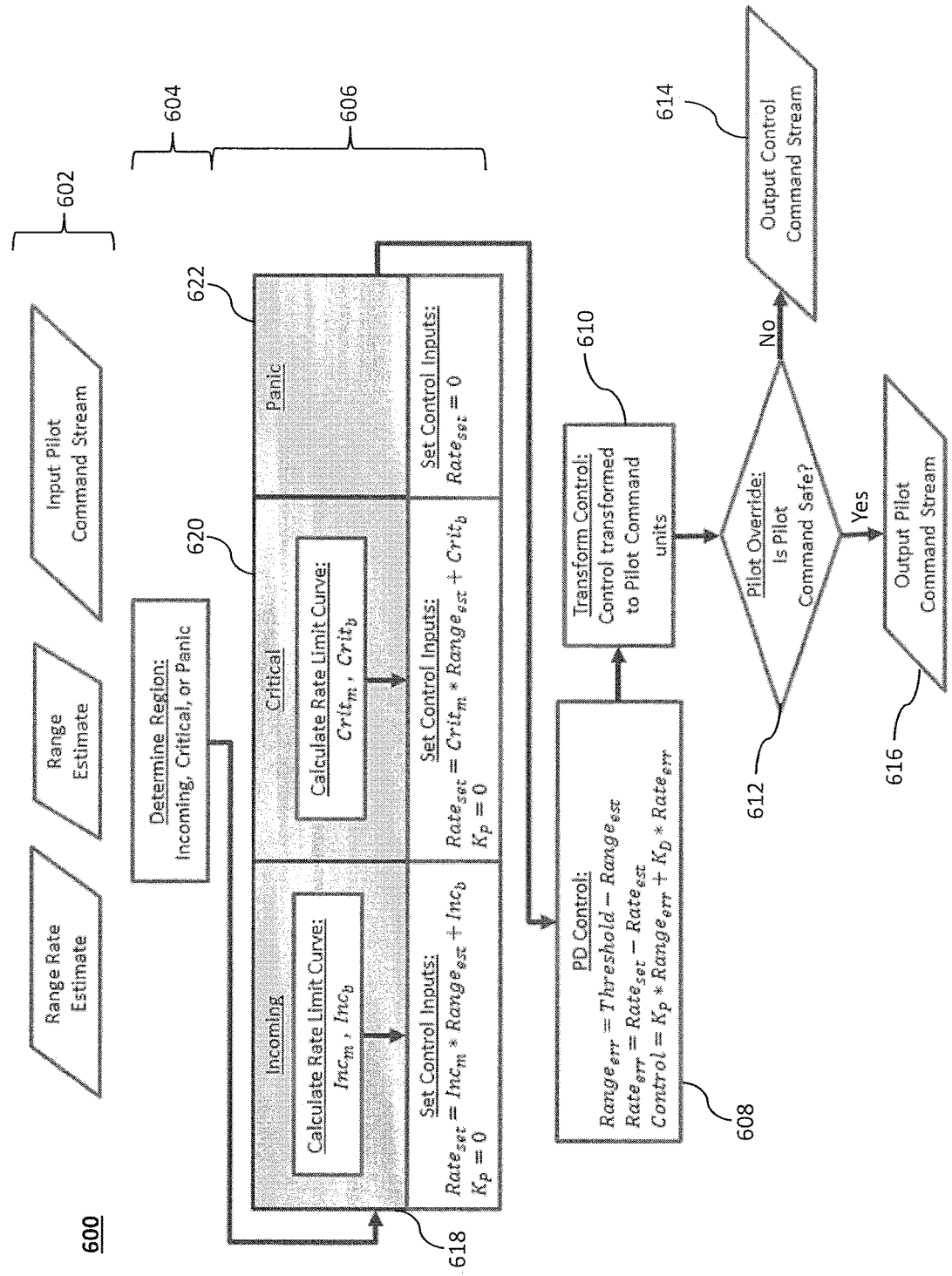
FIG. 6a is a flow chart of an example three-region collision protection function with pilot override.

An example three-region collision protection function may be facilitated using the three-region collision protection algorithm 600 illustrated in FIG. 6a. As illustrated, inputs to the three-region collision protection algorithm 600 from one or more sensors 210, a human pilot, or an autopilot are received at step 602. The inputs can include a range-rate estimate, a range estimate, and an input pilot command stream (i.e., pilot commands), which may be a command stream from either a human operator or an autopilot. Using these three inputs, the three-region collision protection algorithm 600 determines, at step 604, a region from a plurality of regions within a physical space in which the target is currently positioned. As will be discussed, a region is an area of space, or portion thereof, that is typically defined by the field-of-view of the sensors 210 between the vehicle 200 and the operable range (e.g., maximum operable range) of the sensors 210. In some embodiments, three regions are identified as: an incoming region 622, a critical region 620, or a panic region 618. The three regions may be identified by using, for example, the formulas provided at step 606.

Figure 6B:
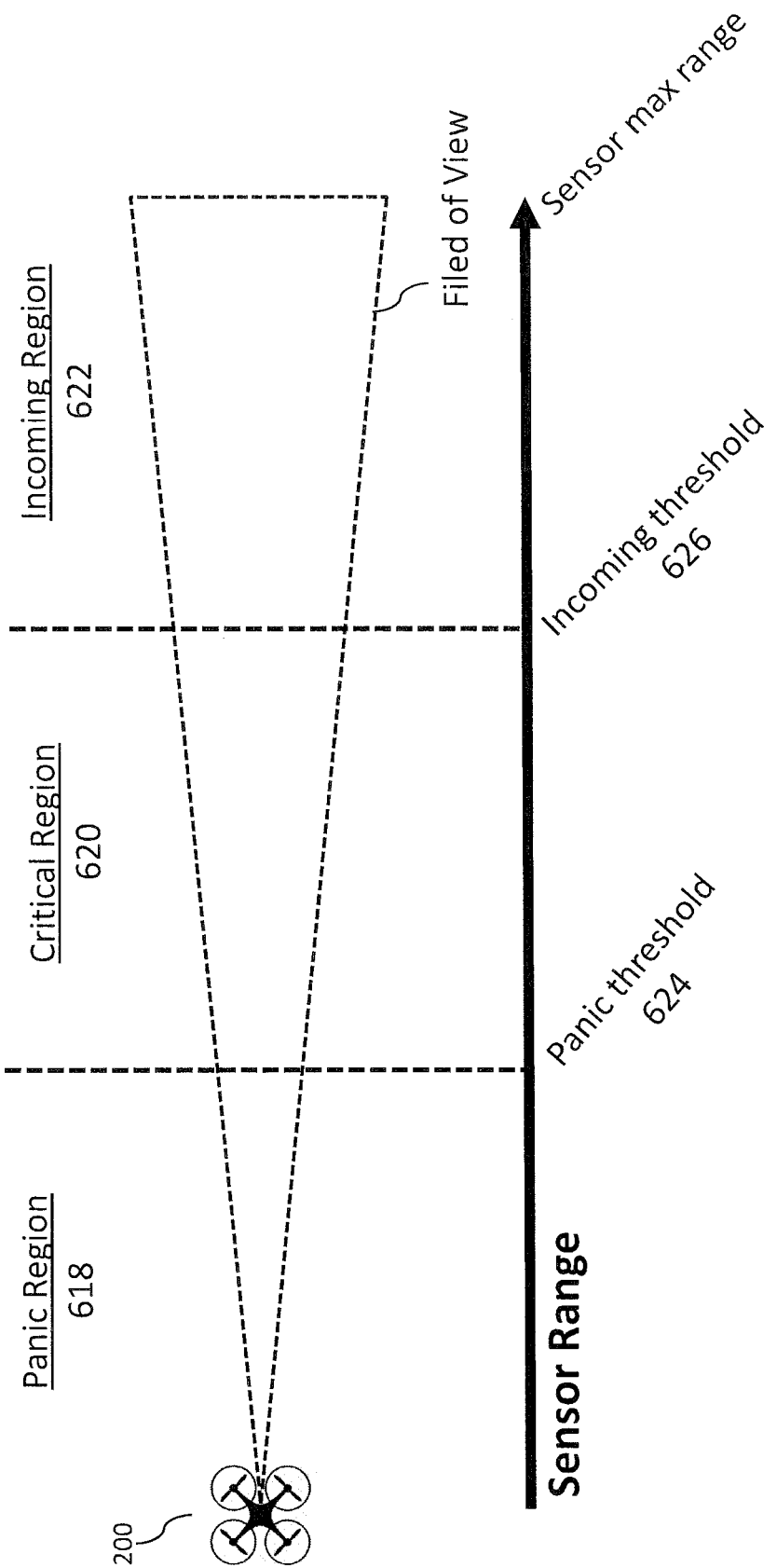
FIG. 6b is an illustration of the aircraft vis-á-vis three regions.

In other embodiments, as illustrated in FIG. 6b, the three regions may be identified based on sensor range thresholds (e.g., first and second distance thresholds 624, 626) as determined by the operator, which dictate the distance boundaries. As illustrated, a first region (the incoming region 622) spans the area between the sensor maximum range and the incoming threshold 626 (e.g., a first threshold/distance), a second region (the critical region) spans the area between the incoming threshold 626 and the panic threshold 624; and a third region (the panic region 618) spans the area between the panic threshold 624 (e.g., a second threshold/distance) and the vehicle itself. As can be appreciated, the sensor maximum range may refer to the maximum distance at which point a given sensor is able to detect objects/targets with reasonable reliability. As illustrated, the shape of each region may be dictated as a function of the shape of the field of view (FOV). The sensor range thresholds 624, 626 may be received from the operator by the aircraft 200. For example, if the target is located in either the incoming or the critical region, a rate limit curve is calculated in the range, range-rate domain, using the range thresholds and region range-rate limits set by the operator. Based on these determinations, the three-region collision protection algorithm 600 sets the control inputs (e.g., $Rate_{set}$ and/or $K_p$) in step 606. The three-region collision protection algorithm 600 subsequently inputs the $Rate_{set}$ and/or $K_p$ control inputs from step 606 to a proportional-derivative (PD) controller at steps 608 to output control data. At step 610, the three-region collision protection algorithm 600 transforms the control data (i.e., unit-less, range from −1 to 1) from step 608 to a control command stream (i.e., in pilot command units input from step 602—such as PWM pulse length, range 1000 to 2000). At step 612, the three-region collision protection algorithm 600 compares the control command stream from step 610 to the pilot command stream (i.e., a pilot command—the input pilot command stream of step 602) to determine whether the pilot command is safe. A pilot command is deemed unsafe if the command can be interpreted as attempting to reduce the range from the vehicle to the target, or increase the vehicle rate above the rate limit (e.g., $Rate_{set}$) as set in 606. If the pilot command is determined not to be safe (i.e., unsafe), the three-region collision protection algorithm 600 outputs the control command stream from step 610 at step 614. If the pilot command is determined to be safe, the three-region collision protection algorithm 600 outputs the input pilot command stream from step 602 at step 616.

FIG. 6b illustrates an exemplary embodiment of the three regions, i.e., panic region 618, critical region 620, and incoming region 622. The aircraft 200 may have a field of view as shown in FIG. 6b. In this embodiment, the field of view represents the sensors' field of view up to the sensor max range. The field of view may be divided in to the three regions based on the operator's threshold inputs, such as the panic threshold 624 and incoming threshold 626. As such, the control of the aircraft 200 may be uniquely restricted as the aircraft 200 enters each of the three regions. By way of example, the vehicle's 200 maximum speed, acceleration, and/or the rate limit may be restricted differently as the aircraft 200 enters each of the three regions 618, 620, 622. Once the aircraft 200 is located in the panic region 618, the system may control the aircraft 200 to slow down. As the aircraft 200 enters the critical region 620, the aircraft 200 may further slowdown or brake. Finally, when the aircraft 200 is located in the incoming region 622 (e.g., the aircraft 200 is in the closest region towards an obstacle within its field of view), a braking command may be issued and/or a forward command input by the operator may be ignored to disable any control command to maneuver the aircraft 200 forward. These and other various examples of restricting commands/controls would be apparent in view of the subject disclosure to those having ordinary skill in the art.

Landing Assist Module. A landing assist module includes circuitry to autonomously land an aircraft 200 with nominal input from the operator by automatically controlling the steering mechanism 304 and/or throttle during a landing operation. In certain aspects, however, the processor 340 of the dynamic collision-avoidance system 302 may execute the landing assist function. The landing assist module benefits from sensor feedback to prohibit the aircraft 200 from landing on obstructions and/or in locations that may result in a crash or other hazard to the aircraft 200 (e.g., due to an obstacle). The landing assist module uses sensory inputs to close the loop during a landing maneuver to ensure a smooth and safe landing. More specifically, the landing assist module employs inputs from one or more sensors 210 capable of measuring range to multiple targets below the aircraft 200. The one or more sensors 210 may be, for example, RADAR, LiDAR, stereovision (via two or more cameras), etc.

The landing assist system provides closed loop control and a safe landing check to a flight control system 306 of the aircraft 200 without the need for a beacon or fiducial overseer. By surveying the landing site (e.g., at the objective 102) and calculating a confidence value based on a target filter (described below), the aircraft 200 (via the dynamic collision-avoidance system 302/RFCA module 500/*etc.*) can determine whether the area below the aircraft 200 can be used for closed-loop autonomous landing. In addition to identifying and/or confirming safe landing zones, the landing assist module can also generate throttle commands and/or control commands for the steering mechanism 304 to smoothly land the aircraft 200.

The landing assist module maintains safe operation of the aircraft 200 through altitude clearance and closed-loop throttle commands. The landing assist module measures an altitude of the aircraft 200 through the one or more sensors 210 and performs a closed loop throttle control of the aircraft 200 to provide landing assist. In the event an obstacle is detected (e.g., by an RFCA module 500 in a downward facing configuration or another sensors 210), a wave-off operation may be performed whereby the aircraft 200 aborts its landing and/or identifies a new landing area. Moreover, range measurements are filtered to first determine the landing target, then to generate a closed loop throttle control/ control command, and finally to "wave-off" (e.g., abort) an autonomous land that do not satisfy the landing parameters (e.g., confidence, max range, and descent rate). The RFCA module 500 may subsequently identify a new landing zone based on the sensor measurements, or perform a maneuver other than a hover when the landing zone has been deemed unsafe.

Figure 7:
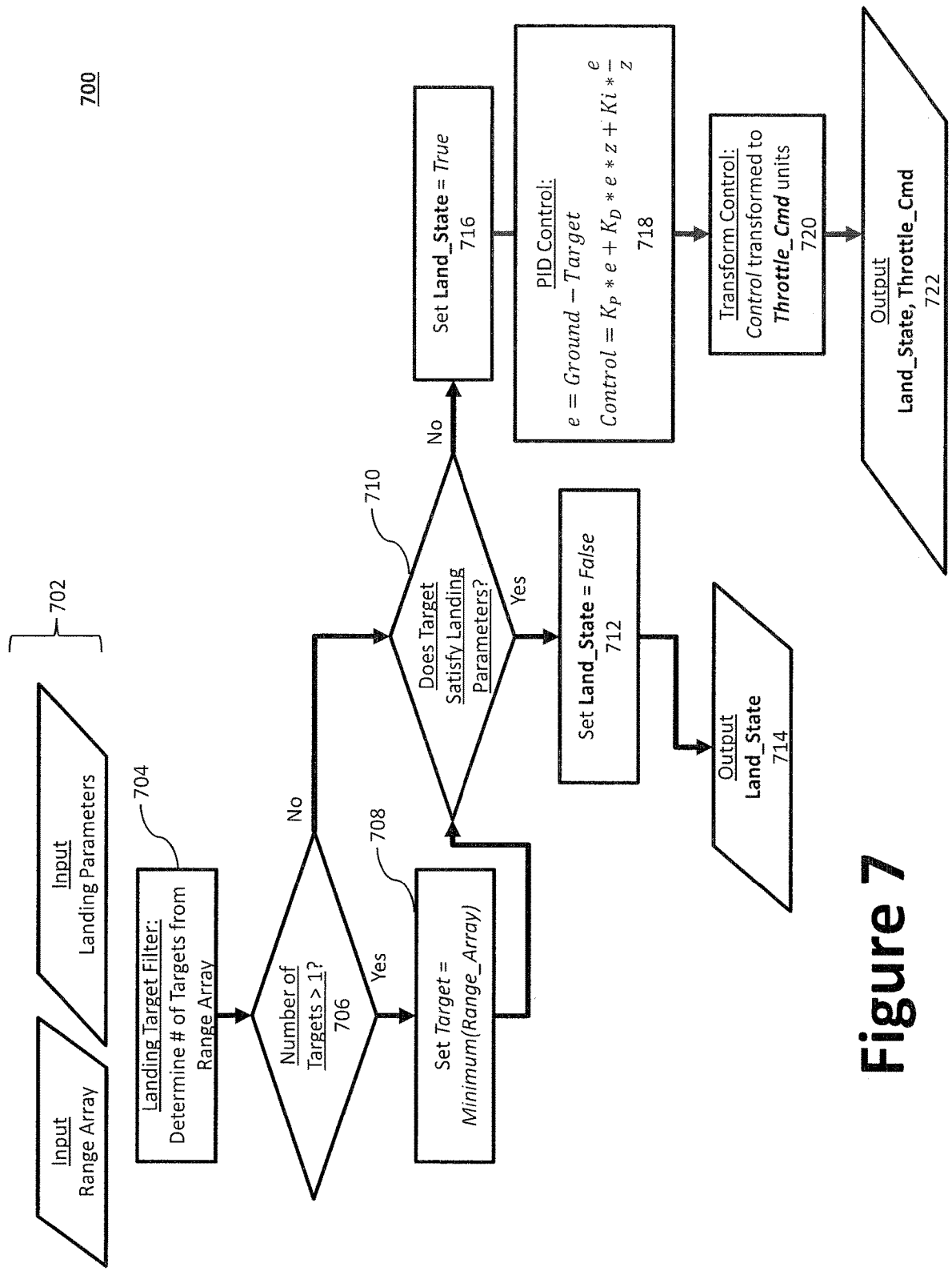
FIG. 7 is a flow chart of an example landing assist module.

FIG. 7 illustrates an example landing assist flow chart 700 for a landing assist function of a landing assist module. As illustrated, inputs to the landing assist module are received at step 702. The inputs can include a range array and landing parameters, which may be generated by either a human operator or an autopilot.

At step 704, a landing target filter determines the number of targets from range array. At step 706, the landing assist module determines whether the number of targets is greater than one. If the number of targets is greater than one, the landing assist module proceeds to step 708, otherwise the landing assist module proceeds to step 710. At step 708, the landing assist module sets the target to equal Minimum (Range_Array) and proceeds to step 710. At step 710, the landing assist module determines whether the target satisfies the landing parameters. If the target satisfies the landing parameters, the landing assist module proceeds to step 712, otherwise the landing assist module proceeds to step 716. At step 712, the landing assist module sets Land_State to equal False and proceeds to step 714. At step 714, the landing assist module outputs, for example, Land_State to the flight control system 306. At step 716, the landing assist module sets Land_State to equal True and proceeds to step 718. At step 718, the landing assist module employs proportional-integral-derivative (PID) controller to general a control signal and proceeds to step 720. At step 720, the landing assist module transforms the control signal from step 718 to a Throttle_Cmd units. At step 722, the landing assist module outputs, for example, Land_State and Throttle_Cmd from step 720 to the flight control system 306. The vehicle flight control system can then query the Land_State to take appropriate action and apply the Throttle_Cmd to the appropriate control loop.

A default output from the landing assist module may include, for example: Altitude_Clearance, Pilot_Thrust_Command, and Land_State. The output may, however, be customized to meet a particular need. A custom output may include, for example: Altitude_Relative, Target_VZ (velocity in z-direction). The parameters of the landing assist module can be configured through API.

Target-filtering Module. A problem with RADAR sensors is that the output is typically scattered and chaotic data due to the RADAR sensor's ability to detect objects over a large area. Consequently, construing the data returned from the RADAR sensor can be difficult, especially for navigational decision processes. In operation, a RADAR sensor may measures the five most prominent objects within its line of sight to output both the relative distance of the object and the magnitude at which the RADAR is detecting. These values are typically output in order of descending magnitudes, but this method of feedback is inadequate for collision avoidance and autonomous flight because, in a dynamic environment, obstructions are continuously surpassing each other in magnitude (as seen by the RADAR) and reported distances are interchanged; thus, causing large jumps in feedback that severely impacts closed loop controllers.

A solution is to employ a target-filtering module including circuitry to implements a target-filtering algorithm to detect real objects versus noise, and to track the objects such that clean feedback signals are returned to the aircraft 200. The target-filtering module implements a target-filtering algorithm to prevent jumps, smooth the output, and report a confidence value, which can be used to prevent false-positives of a collision avoidance system. Target-filtering and optimization of a five range, five magnitude RADAR unit, therefore, allows for the identification and tracking of obstruction using data obtained from a RADAR sensor. The target-filtering module may therefore provide filtering and optimization of a five range, five magnitude RADAR sensor payload for an aircraft 200 to address this problem by enabling the tracking of five objects simultaneously.

The capability to perform object tracking enhances both autonomous navigation and collision avoidance. In certain aspects, the processor 340 of the dynamic collision-avoidance system 302 may execute the disclosed target-filtering function. Therefore, a target-filtering module converts unstable and noisy RADAR measurements into a clean signal capable of being utilized for collision avoidance as well as autonomous flight feedback. The target-filtering module emphasizes the strengths of the RADAR module, while attenuating its drawbacks to optimize performance for the aircraft 200. Similar solutions can be derived by minor altercations of the current algorithm. There is some flexibility in the choice of sub-functions (i.e. types of digital filters, linear vs. polynomial curve fitting, Gaussian vs. Binomial estimated distributions, etc.).

Figure 8:
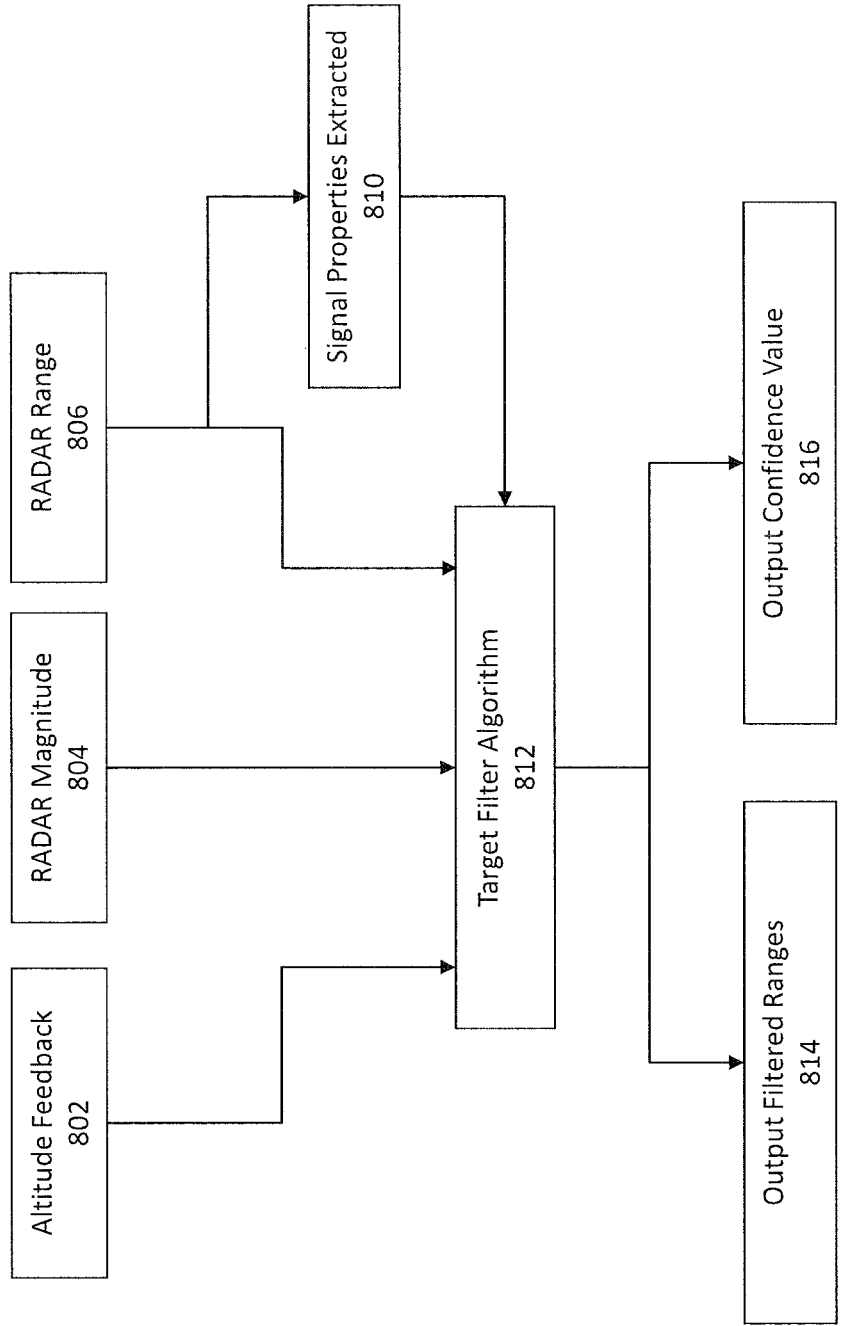
FIG. 8 is an input and output diagram of an example target filter.

FIG. 8 illustrates an input and output diagram 800 of an example target filter module, which includes circuitry to combines sensory data from one or more sensors 210 to generate filtered ranges with corresponding confidence values using a target filter algorithm 812. The one or more sensors 210 may include a RADAR and altimeter to collect altitude measurements 802, RADAR magnitude 804, and RADAR range 806. Using signal property extraction techniques 810, the target filter algorithm 812 may detect outlier measurements from the RADAR to eliminate faulty data points. Range assignments and confidence values are calculated using weighted averages of signal properties, RADAR magnitudes, and estimates of ground noise.

Figure 9:
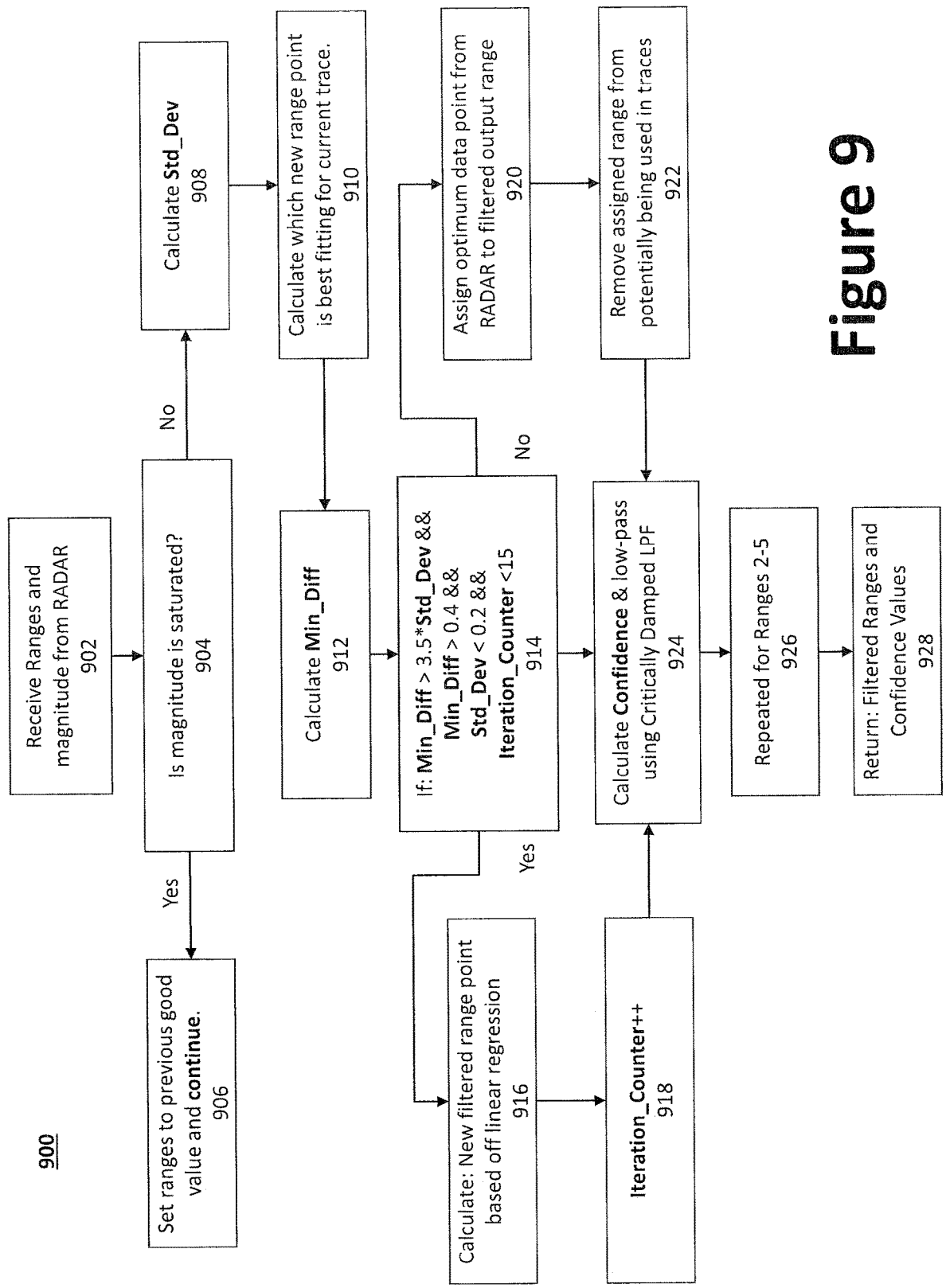
FIG. 9 is a flow chart of an example target-filtering function.

FIG. 9 illustrates an example flow chart 900 for providing a target-filtering functionality using a target-filtering module, where the Std_Dev is the standard deviation of the most recent 20 points of a trace through linear regression of these 20 points. The Min_Diff is the minimum difference between a trace's most recent range and the assigned range from the incoming data. The Iteration_Counter (Iteration Count or Counter) is the number of consecutive extrapolations. Finally, the Confidence Value is the confidence of a range being a real target, which is calculated using the weighted sums of Magnitude and Std_Dev.

At step 902, the target-filtering module receives the first of five new ranges and magnitude from RADAR for the five most prominent objects within the line of sight, and then proceeds to step 904. At step 904, the target-filtering module determines whether the magnitude is saturated. If the magnitude is saturated at step 904, the target-filtering module sets ranges to a previously known good value at step 906 and continues at step 908. If the magnitude is not saturated at step 904, the target-filtering module continues to step 908. At step 908, the target-filtering module calculates the Std_Dev and proceeds to step 910. At step 910, the target-filtering module calculates and/or identified the new range point that is best fitting for the current trace and proceeds to step 912. At step 912, the target-filtering module calculates the Min_Diff and proceeds to step 914. At step 914, the target-filtering module determines whether four conditions are met, the four conditions being: whether (1) the Min_Diff is greater than 3.5 times the Std_Dev; (2) Min_Diff is greater than 0.4; (3) Std_Dev is less than 0.2; and (4) Iteration_Counter is less than 15. If each the four conditions is met at step 914, the target-filtering module proceeds to step 916; otherwise the target-filtering module proceeds to step 920.

At step 916, the target-filtering module calculates new filtered range point using linear regression and proceeds to step 918. At step 918, the target-filtering module increments the Iteration_Counter and proceeds to step 924.

At step 920, the target-filtering module assigns an optimum data point from the RADAR to filter the output range and proceeds to step 922. At step 922, the target-filtering module removes assigned ranges from potentially being used in traces and proceeds to step 924.

At step 924, the target-filtering module calculates confidence and low-pass using critically damped low-pass filter (LPF) and proceeds to step 926. The confidence and low-pass values may be calculated using a weighted average of statistical terms derived from the input range signal (e.g., signal mean, standard deviation, and magnitude). The weighting of the terms in the confidence calculation can be determined by the operator (i.e., operator-defined) and tuned for desired filter performance (e.g., by the operator). At step 926, the target-filtering module repeats the forgoing (starting at step 902) for each of ranges 2-5 and, when all of ranges 1-5 are complete, proceeds to step 928. At step 928, the target-filtering module returns filtered range and confidence values.

In some embodiments, the confidence and low-pass values may be determined based on an environment in which the aircraft 200 is commonly operated. For example, in an operating environment where snow is common, the reflectivity of the snow may be considered a common cause of the level of noise being detected. As such, the system may set the confidence and/or low-pass values accordingly to adjust the acceptable noise level detected by the RADAR. Similarly, a machine learning algorithm may be applied with the target-filtering functionality of the presently described system.

The systems described herein may also include client devices, which may include any devices operated by operators to initiate, manage, monitor, control, or otherwise interact with the navigation system or autonomous vehicle. This may include desktop computers, laptop computers, network computers, tablets, or any other computing device that can participate in the systems as contemplated herein. The client devices may include an operator interface, which may include a graphical user interface (GUI) as the operator interface, a text or command line interface, a voice-controlled interface, and/or a gesture-based interface to control operation of the navigation system or autonomous vehicle. The operator interface may be maintained by a locally executing application on one of the client devices that receives data and status information from, e.g., the navigation system or autonomous vehicle. The operator interface may create a suitable display on the client device for operator interaction. For example, the operator interface may include a display that displays, in real time, views from the cameras in the optical system, or displays other data from other sensors within the navigation system. In other embodiments, the operator interface may be remotely served and presented on one of the client devices. For example, where the navigation system or autonomous vehicle includes a web server that provides information through one or more web pages or the like that can be displayed within a web browser or similar client executing on one of the client devices. In one aspect, the operator interface may include a voice-controlled interface that receives spoken commands from an operator and/or provides spoken feedback to the operator.

While the above systems are primarily described as being applied to aerial vehicles, one of skill in the art would understand that such systems, methods, and techniques might be employed with other technologies, such as automotive, warehouse equipment, construction equipment, cranes, powered wheel chairs, airport equipment, etc.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors, or other programmable devices or processing circuitry, along with internal and/or external memory. This may also, or instead, include one or more application-specific integrated circuits, programmable gate arrays, programmable array logic components, or any other device or devices that may be configured to process electronic signals. It will further be appreciated that a realization of the processes or devices described above may include computer-executable code, created using a structured programming language such as C, an object-oriented programming language such as C++, or any other high-level or low-level programming language (including assembly languages, hardware description languages, and database programming languages and technologies) that may be stored, compiled, or interpreted to run on one of the above devices, as well as heterogeneous combinations of processors, processor architectures, or combinations of different hardware and software. At the same time, processing may be distributed across devices, such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executed on one or more computing devices, performs any and/or all of the steps of the control systems described above. The code may be stored in a non-transitory fashion in a computer memory, which may be a memory from which the program executes (such as random access memory associated with a processor) or a storage device such as a disk drive, flash memory, or any other optical, electromagnetic, magnetic, infrared, or other device or combination of devices. In another aspect, any of the systems and methods described above may be embodied in any suitable transmission or propagation medium carrying computer-executable code and/or any inputs or outputs from it.

The method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not be located within a particular jurisdiction.

Any patents, patent publications, or articles cited herein are hereby incorporated by reference in their entirety. It will be appreciated that the methods and systems described above are set forth by way of example and not of limitation. Numerous variations, additions, omissions, and other modifications will be apparent to one of ordinary skill in the art. In addition, the order or presentation of method steps in the description above and attached drawings is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method for performing a target-filtering operation in an aircraft, the method comprising:
   receiving range and magnitude data from a RADAR system for an obstacle within a line of sight of the aircraft;
   determining, via a processor and based at least in part on the range and magnitude data, whether the magnitude is saturated;
   setting, via the processor, the range to a predetermined value if the magnitude is saturated;
   calculating, via the processor, a standard deviation of at least a portion of a trace reflecting the range and magnitude data over time;
   determining, via the processor, a new range point for the trace;
   calculating, via the processor, a minimum difference between the new range point for the trace and an assigned range from incoming data; and
   calculating, via the processor, a confidence and low-pass value using a critically damped low-pass filter (LPF).

2. The method of claim 1, wherein each step of claim 1 is performed for each of a predetermined number of obstacles within a line of sight of the aircraft.

3. The method of claim 2, wherein the predetermined number of obstacles comprises five obstacles within the line of sight that are determined to be most prominent.

4. The method of claim 1, wherein the standard deviation is of most recent 20 points of the trace through linear regression of the most recent 20 points.

5. The method of claim 1, wherein the minimum difference is a different between a most recent range of the trace and an assigned range from incoming data.

6. The method of claim 1, wherein the confidence and low-pass value is calculated using a weighted average of statistical terms derived from a signal mean, a standard deviation, and a magnitude.

7. The method of claim 6, wherein the weighted average is operator-defined for a desired filter performance.

8. The method of claim 1, further comprising the step of determining, via the processor, whether each of a plurality of conditions are met, wherein the processor is configured to calculate a new filtered range point using linear regression if one or more of the plurality of conditions are not met; and incrementing an iteration counter.

9. The method of claim 8, wherein the plurality of conditions comprises:
whether (1) the minimum difference is greater than 3.5 times the standard deviation; and (2) the minimum difference is greater than 0.4.

10. The method of claim 8, wherein the plurality of conditions further comprises: whether (1) the standard deviation is less than 0.2; and (2) the iteration counter is less than 15.

11. A system for performing a target-filtering operation in an aircraft, the system comprising a processor operatively coupled with a RADAR system and a memory device, wherein the processor is further configured to:
receive range and magnitude data from the RADAR system for an obstacle within a line of sight of the aircraft;
determine, based at least in part on the range and magnitude data, whether the magnitude is saturated;
setting, via a processor, the range to a predetermined value if the magnitude is saturated;
calculate a standard deviation of at least a portion of a trace reflecting the range and magnitude data over time;
determine a new range point for the trace;
calculate a minimum difference between the new range point for the trace and an assigned range from incoming data; and
calculate a confidence and low-pass value via a critically damped low-pass filter (LPF).

12. A navigation system for providing an aircraft with collision protection, the navigation system comprising:
a sensor configured to couple to the aircraft and to identify obstacles within a field of view;
a processor operatively coupled with the sensor and a memory device, wherein the processor is configured to:
receive a first command stream;
identify an obstacle within the field of view based at least in part on a sensor input from said sensor;
determine a region from a plurality of regions within the field of view in which the obstacle is positioned, wherein the region is determined based at least in part on the sensor input;
set a control input as a function of the region determined from the plurality of regions;
generate, via the processor, a second command stream as a function of control data, wherein the control data is generated based at least in part on the control inputs; and
compare, via the processor, the second command stream to the first command stream to determine whether the first command stream is safe.

13. The navigation system of claim 12, wherein the control data is generated using a proportional-integral-derivative (PID) controller.

14. The navigation system of claim 12, wherein the second command stream is communicated to a flight controller of the aircraft in lieu of the first command stream when the first command stream is determined not to be safe.

15. The navigation system of claim 12, wherein the plurality of regions comprises a first region, a second region, and a third region.

16. The navigation system of claim 12, wherein a first command stream is determined not to be safe if the first command stream can be interpreted by the processor as attempting to (1) reduce a range between the aircraft and the obstacle or (2) increase a rate of the aircraft above a rate limit set by the control data.

17. The navigation system of claim 12, wherein the first command stream is from a pilot of the aircraft.

18. The navigation system of claim 17, wherein the processor is configured to receive a pilot override command from the pilot that overrides the second command stream.

19. The navigation system of claim 12, further comprising a landing assist module to instruct the aircraft to perform a landing maneuver to avoid an obstruction detected below the aircraft.

20. The navigation system of claim 12, wherein the processor is configured to perform a target-filtering operation that comprises the steps of:
receiving range and magnitude data from a RADAR system for an obstacle within a line of sight of the aircraft;
determining, based at least in part on the range and magnitude data, whether the magnitude is saturated;
calculating a standard deviation of at least a portion of a trace reflecting the range and magnitude data over time;
determining a new range point for the trace;
calculating a minimum difference between the new range point for the trace and an assigned range from incoming data; and
calculating a confidence and low-pass value using a critically damped low-pass filter (LPF).

\* \* \* \* \*